(12) United States Patent
Muntes et al.

(10) Patent No.: US 9,218,382 B1
(45) Date of Patent: Dec. 22, 2015

(54) EXPONENTIAL HISTOGRAM BASED DATABASE MANAGEMENT FOR COMBINING DATA VALUES IN MEMORY BUCKETS

(71) Applicant: CA, Inc., Islandia, NY (US)

(72) Inventors: Victor Muntes, Barcelona (ES); Sari Setianingsih, DI Yogyakarta (ID); Sergio Gomez, Barcelona (ES)

(73) Assignee: CA, Inc., New York, NY (US)

( * ) Notice: Subject to any disclaimer, the term of this patent is extended or adjusted under 35 U.S.C. 154(b) by 317 days.

(21) Appl. No.: 13/920,918

(22) Filed: Jun. 18, 2013

(51) Int. Cl.
*G06F 17/30* (2006.01)

(52) U.S. Cl.
CPC .............................. *G06F 17/30321* (2013.01)

(58) Field of Classification Search
None
See application file for complete search history.

(56) References Cited

U.S. PATENT DOCUMENTS

| | | | |
|---|---|---|---|
| 2002/0099691 A1* | 7/2002 | Lore et al. | 707/2 |
| 2012/0246657 A1* | 9/2012 | Abdallah | 718/102 |
| 2014/0104084 A1* | 4/2014 | Cohen | 341/87 |
| 2014/0122791 A1* | 5/2014 | Fingerhut et al. | 711/108 |
| 2014/0188906 A1* | 7/2014 | Muller et al. | 707/752 |

OTHER PUBLICATIONS

"The apache Cassandra project", Copyright 2009, Retrieved from the internet at URL http://cassandra.apache.org/.

Abadi et al. "Aurora: a new model and architecture for data stream management", *The VLDB Journal*, vol. 12, No, 2, pp. 120-139, 2003.
Aggarwal "Data Streams: Models and Algorithms", Springer 2007, 24 pages.
Arasu et al. "Approximate Counts and Quantiles over Sliding Windows", *Proceedings of the twenty-third ACM SIGMOD-SIGACT-SIGART symposium on Principles of database systems, ser. PODS 2004*, Jun. 14-16, New York, NY, USA: ACM, 2005, pp. 286-296.
Babcock et al. "Models and issues in data stream systems", *Proceedings of the 21st ACM Symposium on Principles of Database Systems (PODS 2002)*, 2002, 30 pages.
Babcock et al. "Sampling From a Moving Over Streaming Data", *2002 Annual ACM-SIAM Symposium on Discrete Algorithms (SODA 2002)*, 2 pages.
Brewer "Towards Robust Distributed Systems" *Proceedings of the nineteenth annual ACM symposium on Principles of distributed computing, PODC, '00*, New York, NY, USA: ACM, 2000, 12 pages.
Chang et al. "Google Research Publications: Bigtable: A Distributed Storage System for Structured Data", *OSDI '06, Seventh symposium on Operating System Design and Implementation*, Seattle, WA, Nov. 2006, 14 pages.
Cheng et al. "Maintaining Frequent Closed Itemsets over a Sliding Window", *J. Intell. Inf. Syst.*, vol. 31, No. 3, pp. 191-215, Dec. 2008.

(Continued)

*Primary Examiner* — Wilson Lee
(74) *Attorney, Agent, or Firm* — Myers Bigel Sibley & Sajovec, P.A.

(57) ABSTRACT

A method by a database management system provides a sequence of memory buckets that each contain a plurality of data value storage locations. For each of the memory buckets, the method responds to the plurality of data value storage locations of one of the memory buckets becoming filled from storage of data values, by generating a combined data value from combination of the data values and storing the combined data value in an unfilled one of the data value storage locations of a next one of the memory buckets in the sequence. Related computer systems and computer program products are disclosed.

18 Claims, 22 Drawing Sheets

(56) References Cited

OTHER PUBLICATIONS

Cohen et al. "Maintaining Time-Decaying Stream Aggregates", *J. Algorithms*, vol. 59, No. 1, pp. 19-36, Apr. 2006.

Cormode et al. "Exponentially Decayed Aggregates on Data Streams", *IEEE 24th International Conference on Data Engineering, ICDE*, 2008, p. 1379-1381.

Cormode et al. "Time-Decaying Aggregates in Out-of-order Streams", *Proceedings of the twenty-seventy ACM SIGMOD-SIGACT-SIGART symposium on Principles of database systems, ser. PODS '08*, 2008, 10 pages.

Datar et al. "Maintaining Stream Statistics over Sliding Windows", *2002 Annual ACM-SIAM Symposium on Discrete Algorithms (SODA 2002)*, 2002, 14 pages.

DeCandia et al. "Dynamo: Amazon's Highly Available Key-value Store", *SIGOPS Oper. Syst. Rev.*, vol. 41, No. 6, pp. 205-220, Oct. 2007.

Strozzi "NoSQL relational database management system", Copyright 2010, Retrieved from the internet at URL http://www.strozzi.it/cgi-bin/CSA/tw7/1/en_US/nosql/Home%20Page.

The Stream Group, "Stream: The Stanford Stream Data Manager", *IEEE Data Engineering Bulletin*, 26(1), 2003, 8 pages.

Zhou et al. "Tracking clusters in evolving data streams over sliding windows", *Knowl. Inf. Syst.*, 2007, 34 pages.

\* cited by examiner

ColumnFamily: measurements

| DataStream_id | t#1 | t#2 | t#3 | t#4 | t#5 | t#6 |
|---|---|---|---|---|---|---|
| | value | value | value | value | value | value |

ColumnFamily: bars

| | c#0 | c#1 | c#2 | c#3 |
|---|---|---|---|---|
| eh_id:b#0 | A | B | C | D |
| eh_id:b#1 | c#0 | c#1 | c#2 | c#3 |
| | E | F | G | H |
| eh_id:b#2 | c#0 | c#1 | c#2 | c#3 |
| | I | J | K | L |

| | | | | | | | ColumnFamily: buckets | | | |
|---|---|---|---|---|---|---|---|---|---|---|
| | k = 4 | | | | | I J K L | eh_id | b#0 | b#1 | b#2 |
| A | B | C | D | E F G H | | | | {A, B, C, D} | {E, F, G, H} | {I, J, K, L} |

*Figure 12*

| c#0 | c#1 | c#2 | c#3 | c#4 | c#5 |
|---|---|---|---|---|---|
| x5 |  | x1 | x2 | x3 | x4 |

↑ newest     ↑ oldest

EXPONENTIAL HISTOGRAM BASED DATABASE MANAGEMENT FOR COMBINING DATA VALUES IN MEMORY BUCKETS

BACKGROUND

The present disclosure relates to controlling data storage and retrieval in database management systems.

Many recent applications produce data streams rather than a persistent dataset. The nature of persistent dataset is that updates are infrequent and most data are queried repeatedly. In contrast, data streams are changing constantly through continuous generation of new elements. Data from the data streams needs to be at least partially (temporarily) stored to permit analysis. Hence, the amount of stored data can grow to be large. Furthermore, more recent information provided by the data is generally considered to be more important for applications, where, for example, queries may be executed more often on recent information.

Traditional database management systems (DBMS) are originally and especially designed for storing a persistent dataset. Many assumptions are no longer compatible with the characteristics of data streams. In data streams, relations between information are not essential. It is more important that the storage systems provide the ability to store and retrieve a huge amount of data. There has been introduced storage systems which are able to manage a huge amount of data; The term "BigData stores" is coined to refer to such storage systems. They focus on the availability and scalability, while relaxing consistency.

BRIEF SUMMARY

One aspect of the present disclosure is directed to a method by a database management system. The method includes providing a sequence of memory buckets that each contain a plurality of data value storage locations. For each of the memory buckets, the method responds to the plurality of data value storage locations of one of the memory buckets becoming filled from storage of data values, by generating a combined data value from combination of the data values and storing the combined data value in an unfilled one of the data value storage locations of a next one of the memory buckets in the sequence.

Another related aspect of the present disclosure is directed to a computer system that includes a processor and a memory. The memory is coupled to the processor and includes computer readable program code that when executed by the processor causes the processor to perform operations to provide a sequence of memory buckets that each contain a plurality of data value storage locations. For each of the memory buckets, the operation further respond to the plurality of data value storage locations of one of the memory buckets becoming filled from storage of data values, by generating a combined data value from combination of the data values and storing the combined data value in an unfilled one of the data value storage locations of a next one of the memory buckets in the sequence.

Related computer program products are disclosed. It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures.

FIG. 12 illustrates the data model for the bucket-wise approach in mapping exponential histogram data structure into the key value data store in accordance with some embodiments of the present disclosure.

FIG. 13 illustrates a singular array in each bucket for the bucket-wise approach in accordance with some embodiments of the present disclosure.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

1.1 Motivation

With the unbounded length of the data streams, a problem arises with how to organize the data storage in such a way that supports high rates of queries and which can be performed in real-time without having to read huge amounts of data, and how to control the precision of the stored data (with a higher granularity with most recent data). By identifying the characteristics of data streams, some embodiments disclosed herein provide storage systems that can store data streams and support high rates of access/modification requests to the stored data.

1.2 Problem

Figure 1:
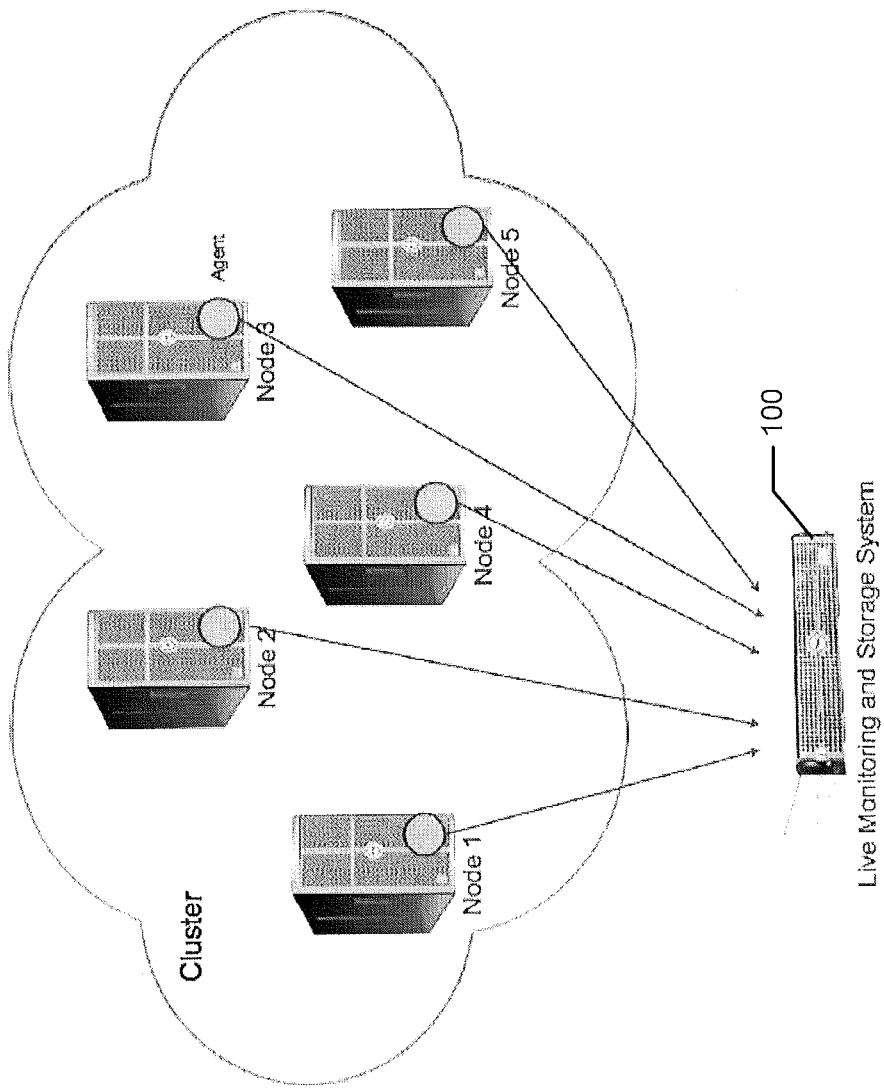
FIG. 1 illustrates a monitoring system where agents collect measurements in each node of a cluster for storage in a live monitoring and storage system.

FIG. 1 illustrates a monitoring system where agents collect data streams from nodes of a cluster for storage in a live monitoring and storage system. The data streams may, for example, be generated by the nodes as the output of various sensors (e.g., video cameras, traffic monitors, etc.). A cluster includes many nodes ("Node)" which may or may not be interconnected. A node may for instance be an identity manager, a Web server, an application server, a Web service, or a database system. Each node, as a part of the distributed system, performs its own task independently. Hence, a system administrator requires monitoring tools which are able to monitor and evaluate the performance of each node individually. An agent is installed in every node to collect any necessary measurements continuously and/or periodically. These measurements are then buffered, aggregated, and transmitted to a monitoring and storage system 100.

The data streams of measurements continuously arrive in the storage system 100. The arrival rate could be as high as 1M measurements/second. Hence, the storage system 100 should be designed to cope with data streams of extremely huge arrival rate. Furthermore, it should also consider the limited size of storage. The measurement metrics sent by agents are meant for monitoring purpose. Therefore, a system administrator should be able to use the data to evaluate the performance of each node over time as well as to query the performance within a specific time range. Data should be able to be retrieved in any given time range.

1.3 Solution

Various embodiments of the present disclosure are directed to a database management system that can be built on top of the existing key-value BigData stores. Some embodiments are described in the context of the Cassandra brand key-value BigData store, although other BigData stores, such as Brisk, Redis, HBase, and Riak, or other data storage systems may be used. Cassandra is noted by name because of its known best-in-class performance. However, any data store may be used with embodiments of the present disclosure.

Because the size of data streams is unbounded, some embodiments apply an approximation technique to incremental combining data values from the data stream for storage in the data storage system. One such technique uses an exponential histogram data compaction process for combining data values from data streams to create a compact summary of the data values and, thereby, reduce the required size of the data storage system. A longer duration of data streams may thereby be represented within constraints of a limited capacity data storage system, and data access latency can be reduced and higher data access rates can be provided.

1.4 Contribution

Various embodiments disclosed herein may be utilized with a sophisticated monitoring tool which goes beyond simple resource utilization reports. This monitoring system may support a large scale enterprise system, which can include hundreds of servers, the generates a very high arrival rate of data streams.

Various embodiments of the data storage system can be optimized for data streams having a high write workload. Furthermore, the required size of the data storage system can be optimized by applying approximation techniques which utilize an exponential histogram data compaction process. These approximation techniques may be implemented in a manner that does not hinder the performance of the data storage system and the ability to query data of any given time range.

1.5 Organization of the Report

The subsequent chapters of this report are organized as follows. Chapter 2 describes the relevant techniques which may have been previously tried to manage data streams. Chapter 3 describes for the background knowledge that is helpful in understanding embodiments disclosed herein, including a detailed explanation of BigData stores and an exponential histogram data compaction process. Chapter 4 explains further embodiments of the data storage system, while further implementation details are explained in Chapter 5. Chapter 6 explains experimental results that have been observed with various embodiments. Chapter 7 provide a summary of some embodiments of the present disclosure.

2.1 Related Work

Recently, there have been substantial amount of research directed toward managing data streams. In general, this work has realized one issue with mining data streams, which is the unbounded length of data streams. This issue potentially leads to many problems, such as the required size of storage to manage the entire data, the limited size of memory to scan the data in order to answer the queries, and the lack of ability to absorb a continuously arriving data stream.

While performing data compression might be an alternative to storing a high volume of data. This option is not preferable for a storage system supporting the monitoring tools. The cost to extract the data in answering queries which needs to scan a huge size of data might not be tolerable.

There are two main approaches for reducing quantity of data values that are stored from data streams, i.e. sliding windows and decaying function in managing a stream of unbounded data. Both approaches attempt to reduce the size of data by intelligently aggregating the information into fewer numbers of data items. This results in a kind of data approximation.

In a sliding window approach, data is only kept for the last N element seen so far, and it simply discards the outdated information. This approach is possibly desirable for many applications which consider the recent data are more significant. One approach using sliding windows maintains aggregates and statistics over data streams, by considering only the last N data elements seen so far. This technique provides an efficient way to manage the unbounded length of data. It only requires $O(\log n)$ spaces to keep information about n data items, while keeping the loss in precision bounded at $1/k$. This technique also works on statistics or aggregates, such as sums and averages.

The aforementioned technique can be extended to use an exponential histogram in handling the evolving data streams. An exponential histogram can effectively eliminate the effect of the outdated information in a gradual manner. Hence, this technique can provide a reasonable summary over the evolving data streams.

The decaying function technique employs a similar assumption, i.e. the significance of data items decrease over time. It manages aggregates over data streams by computing the summaries of data streams. The exponential decay can be controlled based on the weight of a data item occurred a time units ago is $\exp(-\lambda a)$, for a decay parameter $\lambda$. With this decay function, the system would suffer very little space overhead, yet it is able to give a sufficient overview about the data streams.

Traditional database management systems (DBMS) can have difficulties storing data values from data streams because of the high volume of triggers provided to the DBMS. The volume of triggers to the DBMS may be more effectively managed by regulating the incoming data streams in a queue organization which uses QoS-based priority information. This DBMS system can be referred to as a DBMS-active, human-passive model. However, this approach can still suffer problems from effects of a high volume and rate of data. A buffer manager can be provided for fast response to data, however synchronization of the buffer manager can cause a bottleneck.

Chapter 3
3.1 BigData Stores
3.1.1 NoSQL for Big Data Stores

The term No SQL was introduced in 1998 as a name for his open source relational database, which did not offer an SQL interface. Then, the same term was reintroduced in 2009 to refer to open source distributed databases, which are non-compliant with the traditional relational DBMS.

Although there are many variants of NoSQL stores, in general they have the following characteristics: (1) They are lacking of fixed schema because the relations between entities are considered not important. This implies that the join operation is not supported. Hence, any queries must be answered by utilizing only one entity/table. (2) They focus on the high availability and high throughput, which is achieved by relaxing the data consistency. Furthermore, they try to improve the performance by imposing data locality, thus enhancing the efficiency of I/O disk. (3) They are able to scale horizontally. A new machine can be introduced without any down time and the need to reconfigure the system. This property is highly desirable to support many elastic systems, which make use of cloud computing.

Key-value approach is the most popular variant of NoSQL stores. It is one of the simplest data models which merely offers a way to record data; it maps each key with a value. With this approach, it leaves the design and the optimization on how to manage the data to the user. Its schema-less data model offers a freedom to the user to design the data storing based on its queries and its data locality.

3.1.2 Cassandra

Cassandra is a distributed database system for managing large amounts of structured, semi-structured, and unstructured data. It was initially designed by Facebook for its message search engine, and then became an open source Apache project in 2008. Cassandra is currently in use at many companies which have large and active data sets, such as Netflix, Twitter, Urban Airship, Constant Contact, Reddit, Cisco, OpenX, Digg, CloudKick, and Ooyala.

Cassandra brings together the distributed technologies from Amazon's Dynamo, and the data model from Google's BigTable. Cassandra inherits the eventually-consistent property from Dynamo. It is able to provide high availability and performance by sacrificing consistency. Amazon has proven that the storage system can continue to provide an "always-on" experience under many failure scenarios. On the other hand, like BigTable, Cassandra provides a ColumnFamily-based data model which is richer than typical key-value systems. It gives clients the dynamic control over data layout and format, thus creating a better control of performance characteristics.

Data Model

Cassandra is based on a key-value model. Its data model is designed for distributed data on a very large scale. It trades ACID-compliant data practices for important advantages in performance, availability, and operational manageability. Unlike relational DBMSs which try to maintain the relation between entities and reduce the redundancies by normalizing the structure, Cassandra prefers a denormalized structure. Join operation is not supported in Cassandra. Hence, queries should be answered only by a single data table.

Cassandra runs on a cluster, which is a set of nodes (a logical Cassandra instance). A cluster may contain multiple keyspaces, which is analogous to schema in RDBMS. Hence, typically one application will only have one keyspace. Instead of data table, a keyspace consists of many ColumnFamilies, which can be configured individually. A ColumnFamily is a container for rows, which can be referenced by its key; rows are sorted and indexed by its key.

A Column is the basic unit of storage. It consists of three attributes: name in an array of bytes, value in an array of bytes, and timestamp in long data type. It is not necessary that rows in the same ColumnFamily comprise the same sets of columns. A column can be accessed by providing its row key and its column name. Hence, basically Cassandra extends basic key-value model with two levels of nesting.

Figure 2:
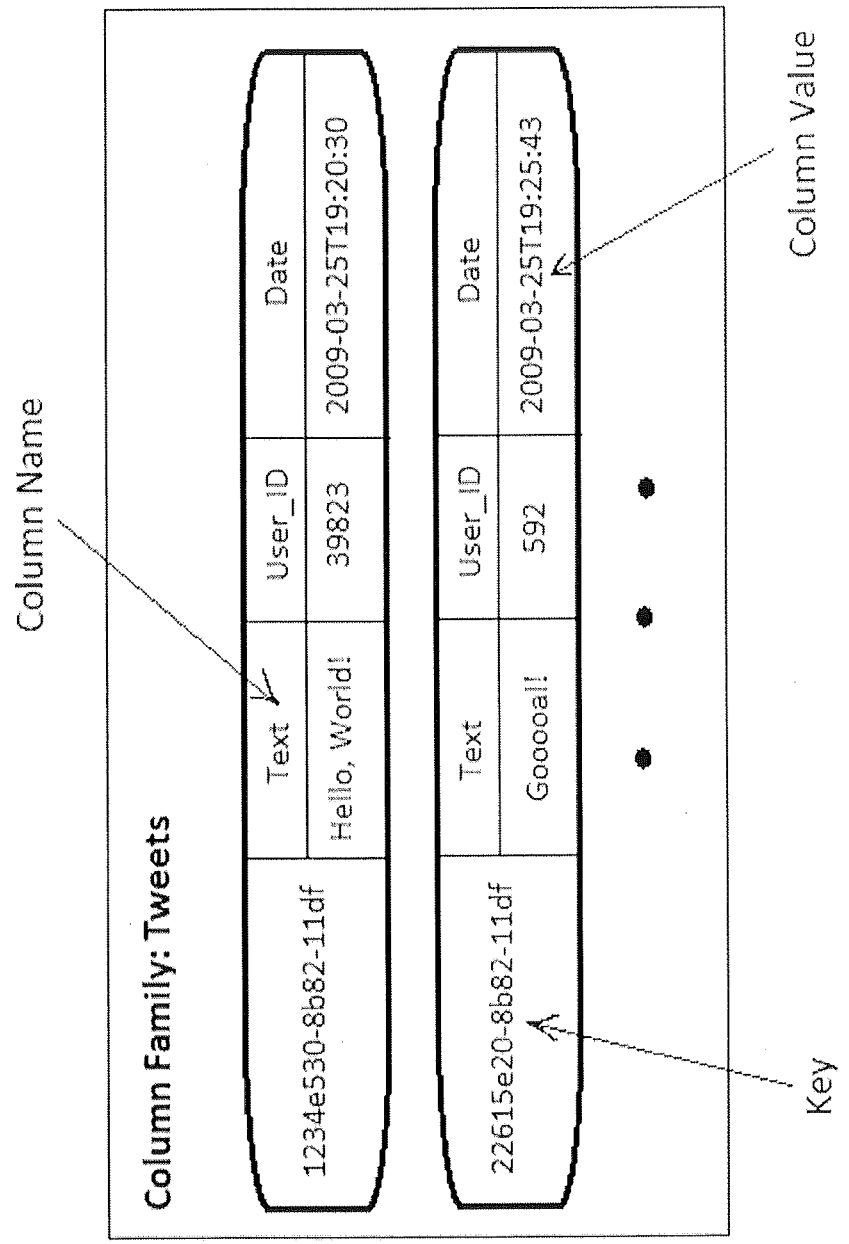
FIG. 2 illustrates an example of a Twitter data model in Cassandra.

FIG. 2 illustrates an example of a Twitter data model in Cassandra. ColumnFamily Tweets contains many records representing the user's tweets. The row key is of Time UUID type and generated when the tweet is received. Columns simply describe the attributes of tweets, which are the tweet's message, the identifier of user, and the date.

Data Partitioning

Figure 3:
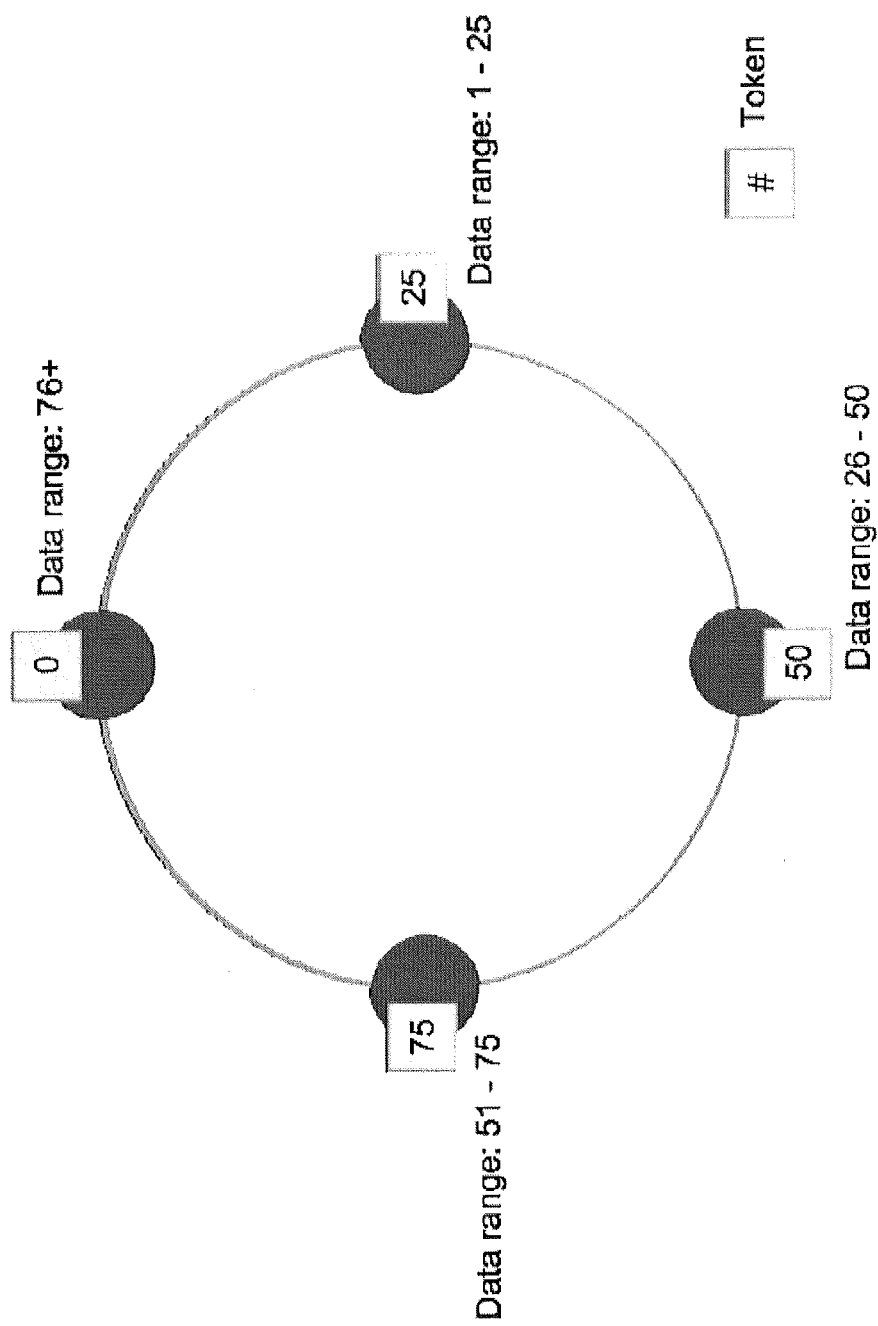
FIG. 3 illustrates how data is distributed across the nodes based on token flow.

The entire data managed in Cassandra is distributed across the nodes in the cluster, and represented as a circular space. ColumnFamily data are indexed based on the row key. When a node joins the ring, it will be assigned a token, which determines the division of the range of data among the nodes. A node is responsible for data whose range is from its predecessor's token (exclusive) to its own token (inclusive). FIG. 3 illustrates how data is distributed across the nodes based on token flow.

Write Requests

Cassandra is especially optimized for highly available data writing, unlike relational DMBS which enforces data integrity, thus paying heavy overhead during the write request. Cassandra has two levels of caching to handle the data record.

Figure 4:
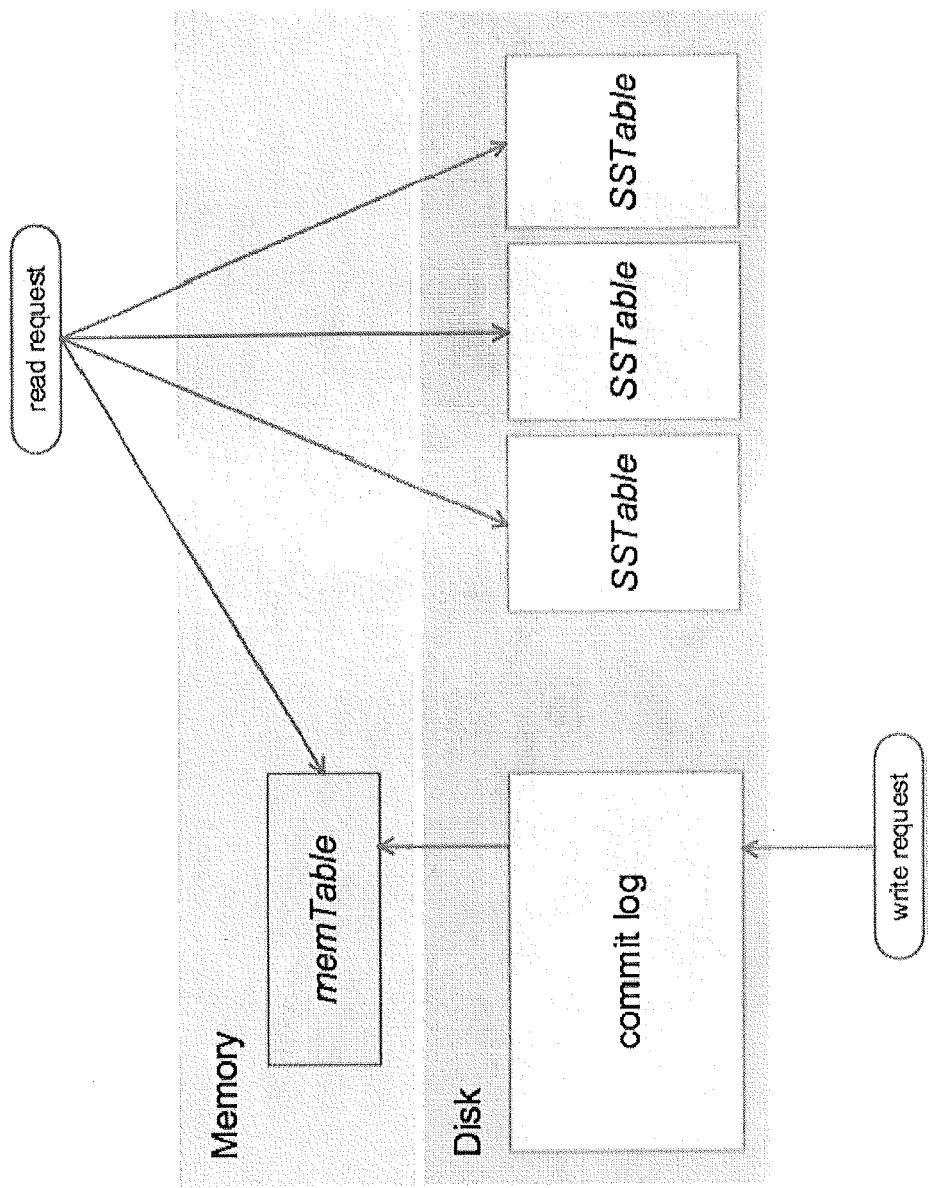
FIG. 4 illustrates how a write request is handled in Cassandra.

FIG. 4 illustrates how a write request is handled in Cassandra. Upon the arrival of a write request, it is delivered to all replicas. A write is considered successful, if it has received successful acknowledgement responses from a number of replicas; this is configured by the write consistency level parameter. Each replica will write this request in a commit log for durability, and then store the data in the memTable, an in-memory data structure, thus avoiding disk I/O. Then, it is periodically and sequentially flushed into the disk, called SortedStringTable (SSTable). SSTable is immutable; this implies that a single row is possibly stored in several SSTables.

Read Requests

To handle a read request, memTable and SSTables are scanned to collect the requested data, see FIG. 4. In the case that there are many records for a single column, the most recent data is returned. To increase the scanning, Cassandra employs an in-memory data structure, called a bloom filter, in order to detect the existence of row in a particular SSTable. This filter improves the performance because it avoids disk I/O in searching a row.

Compaction

Cassandra is a log-structured storage engine; all updates are written sequentially to disk (SSTable). There is no update-in-place in Cassandra because this would require performing random I/O. Hence, many versions of a row may be stored in several SSTables, thus deteriorating the read performance because Cassandra needs to perform disk I/O for many SSTables. To alleviate this problem, compaction is run in background periodically. It merges SSTables together, and creates a new combined SSTable. Furthermore, compaction also removes the deleted rows which are marked with tombstones. It is to be noted that compaction is I/O intensive, hence it might severely affect the performance of read operation.

3.2 Exponential Histogram

An exponential histogram is a special type of histogram which has the ability to preserve the information about time. Instead of counting the number of occurrences which match with a certain property like in a normal histogram, this time-based histogram stores summaries of information with increasing granularity, i.e. an exponential time range. Hence, with this technique, the same size of storage system can represent a significantly longer lifetime. This technique is commonly used in conjunction with the sliding windows of data streaming.

Figure 5:
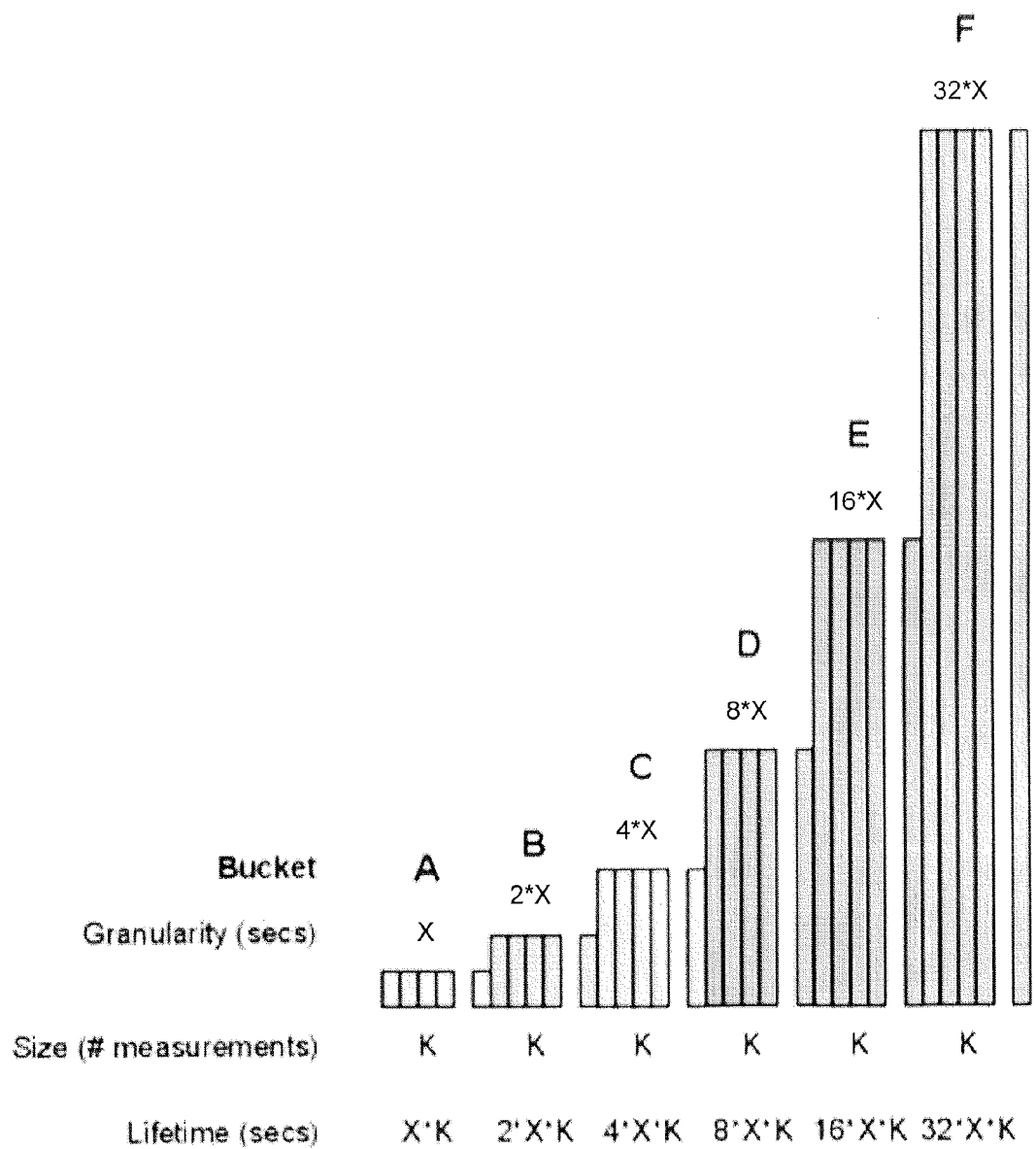
FIG. 5 illustrates an exponential histogram approach to combining values contained in data buckets in accordance with some embodiments of the present disclosure.

FIG. 5 shows an example of an exponential histogram. This histogram includes 6 types of memory buckets, annotated from A to F. Each type of memory bucket has different granularities, i.e. 1, 2, 4, 8, 16, and 32 seconds, of combined data therein. This implies that, for example, memory bucket F stores a single aggregate/value which represents a summary of data values received from a data stream over 32X seconds duration, where X is the lifetime of the smallest granularity. The memory bucket (A) with smallest granularity keeps the most recent data values received from the data stream, while the one with largest granularity (F) stores a combination of data values from earlier memory buckets. Parameter K defines the number of repeated bars of the same granularity and, more particularly, plurality of data value storage locations within a memory bucket. Hence, one type of memory bucket has K bars, which corresponds to K data storage locations for storing a sequence of data values or a combination of data values. This variable can be parameterized, but it may remain the same for all type of memory bucket.

With the aforementioned description of exponential histogram, the recent data are in the best precision, while the past data are in the lowest precision. This property is acceptable to decay the information in data streams, because in the monitoring tools queries are mostly executed on the recent data. The past data are queried less frequent; hence they have less marginal value. Giving a good-enough approximation is significantly better than having no data at all due to the limited storage size.

When storing data streams for a monitoring system, it can be important provide an ability to query on any arbitrary time range. As the sequence of data values is preserved, an arbitrary time range can be located in the histogram. For instance, the past 20-second of data values or data values from 10 to 20 seconds ago. These data values can be located by traversing backward the exponential histogram. In the case that the bucket granularity is bigger than the requested time range, extrapolation may be performed over the retrieved data values. While this will reduce the accuracy of the answer, the error is capped to 1/K.

Chapter 4

Database Management System and Data Storage System Design 4.1 Various Requirements Some embodiments are directed to providing database management systems and associated data storage systems for handling data streams. The systems may be used to support handling of data streams for monitoring tools, such as live monitoring tools. In view of such systems, potential system requirements can include:

1. The system should provide low latency (e.g., real-time) responses to a high rate of (e.g., continuous) queries to the stored data.
2. The system should be able to handle data streams with high arrival rate. It should be able to process and absorb the incoming data stream; discarding the data that may not be susceptible.
3. The system should not let the size of stored data unbounded. It should operate within limited storage constraints of the data storage system. However, it should also enable storage of data values over an acceptably long duration. Approximation of data values is more preferable than providing no indication of are access to the data values.
4. The stored data values should be able to be used to answer queries in an arbitrary time range. Each data item should also maintain the time when the aggregates occur.

4.2 Overview of Some Approaches

Figure 6:
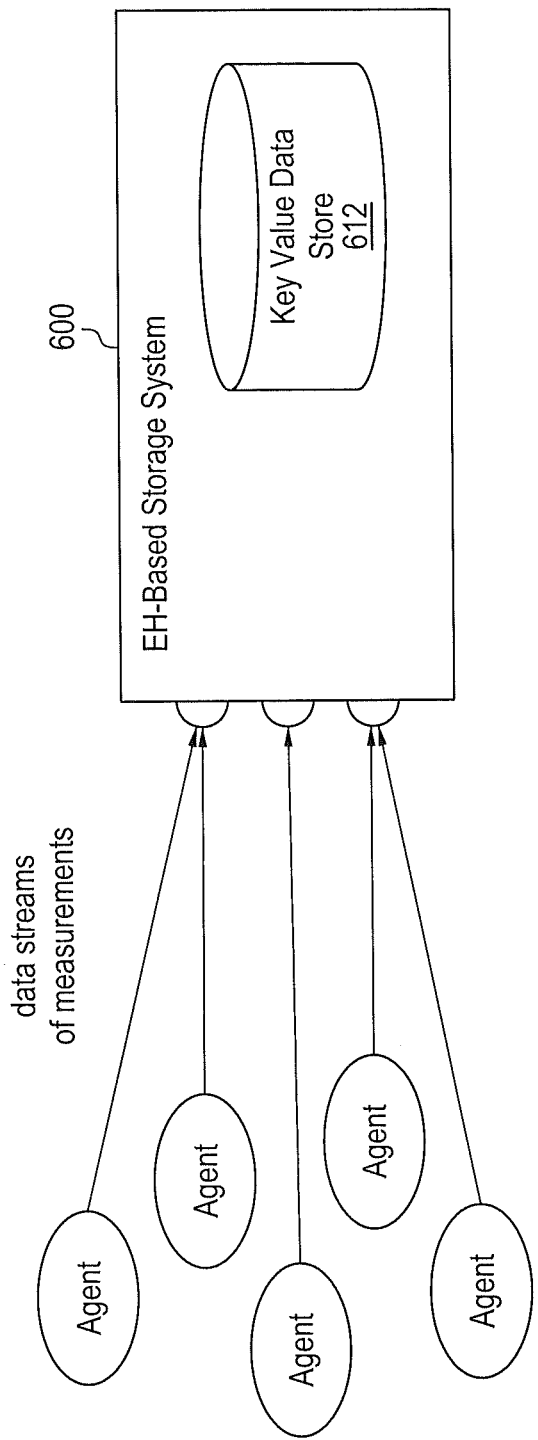
FIG. 6 illustrates the interaction between agents and a database management system in accordance with some embodiments of the present disclosure.

FIG. 6 illustrates the interaction between agents and an exponential histogram (EH) based storage system 600 that may, for example, include column-based key-value data store 612 (e.g., Cassandra, HBase, Redis, etc.) in accordance with some embodiments of the present disclosure. There are many front end agents and components of the system 600 which handle the incoming data streams. To avoid a bottleneck, the front end agents may be configured to be easily replicated. They partition the incoming data streams. Hence, they may be easily scaled.

Figure 7:
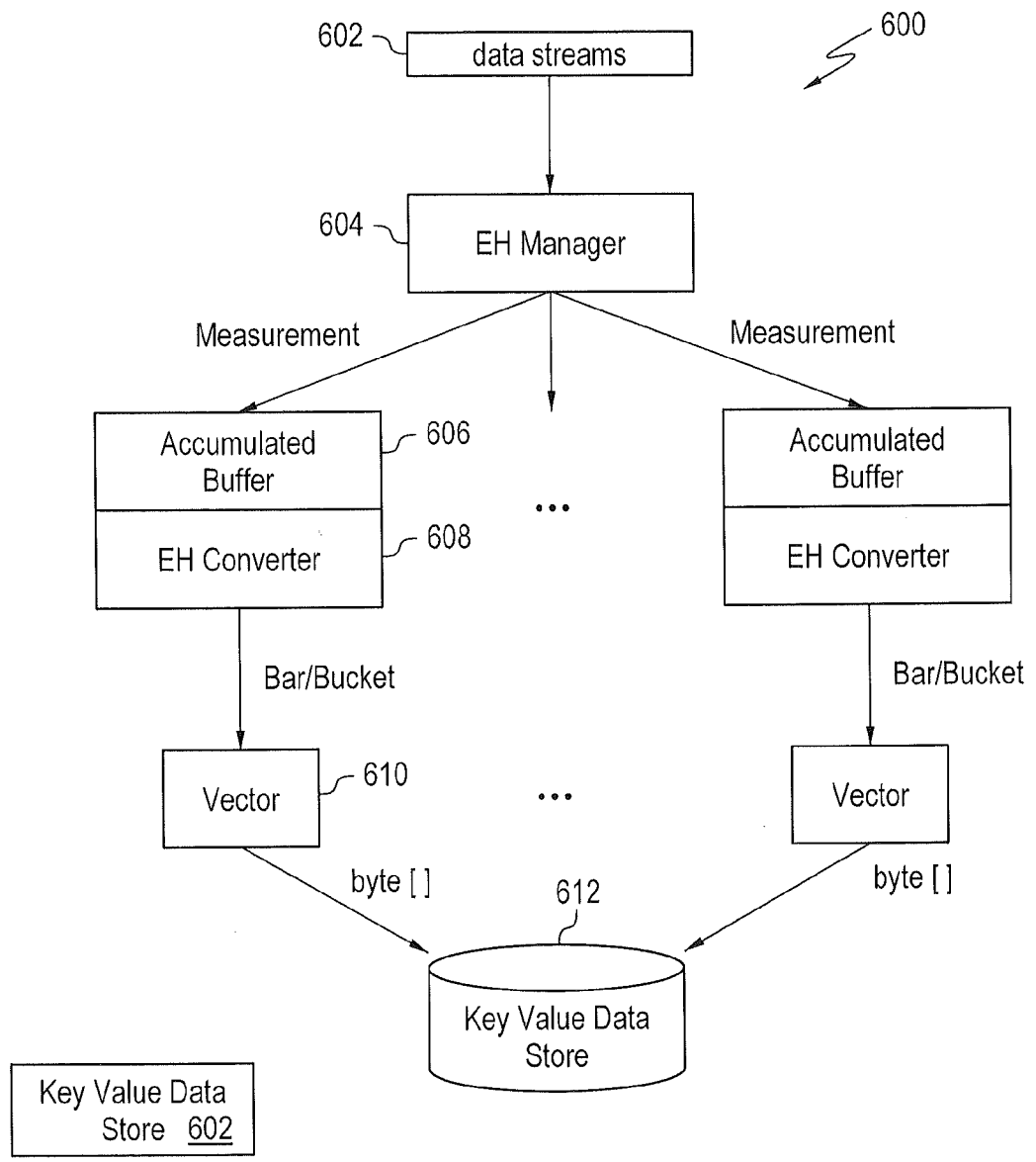
FIG. 7 illustrates the internal architecture of an exponential histogram based storage system in accordance with some embodiments of the present disclosure.

FIG. 7 illustrates the internal architecture of the system 600 in accordance with some embodiments of the present disclosure. When the data streams 602 arrive, the system 600 handles the arrived data values, which may be delivered in bulk. The data values may contain many types of measurements, which depend on the target monitoring tools. For instance, the measurement could be CPU usage, I/O disk, and the network traffic. The EH manager 604 functions to extract the measurements, and then deliver them to the entity which is responsible to that particular measurement. This EH manager 604 should delegate the measurements efficiently.

The system 600 includes accumulated buffers 606 and EH converters 608. Measurements from different data streams may be provided to different ones of the illustrated columns of communicatively connected accumulated buffers 606 and EH converters 608 to output an exponential histogram data structure through a vector client 610 for persistent storage in the key value data store 612, such as the Cassandra key-value data store, HBase, Redis, etc., containing distributed networked storage devices.

4.2.1 Accumulated Buffer 606

The accumulated buffer 606 is responsible for preparing the arriving data values so that they satisfy the input requirements for the EH converter 608. For example, they accumulated buffer 606 performs ordering by sorting the measurements based on their timestamps; each arriving data value consists of the aggregate value and the time range ($t_{start}$, $t_{end}$) when the aggregate occurs. In the realistic scenario, data values may not arrive in a proper order. Furthermore, because the measurement may not be generated periodically, the EH converter 608 can collect the measurements until they fit in the smallest period in the exponential histogram. It is to be noted that the exponential histogram can be configured to consume the data in a fixed period.

4.2.2 Exponential Converter 608

Figure 8:
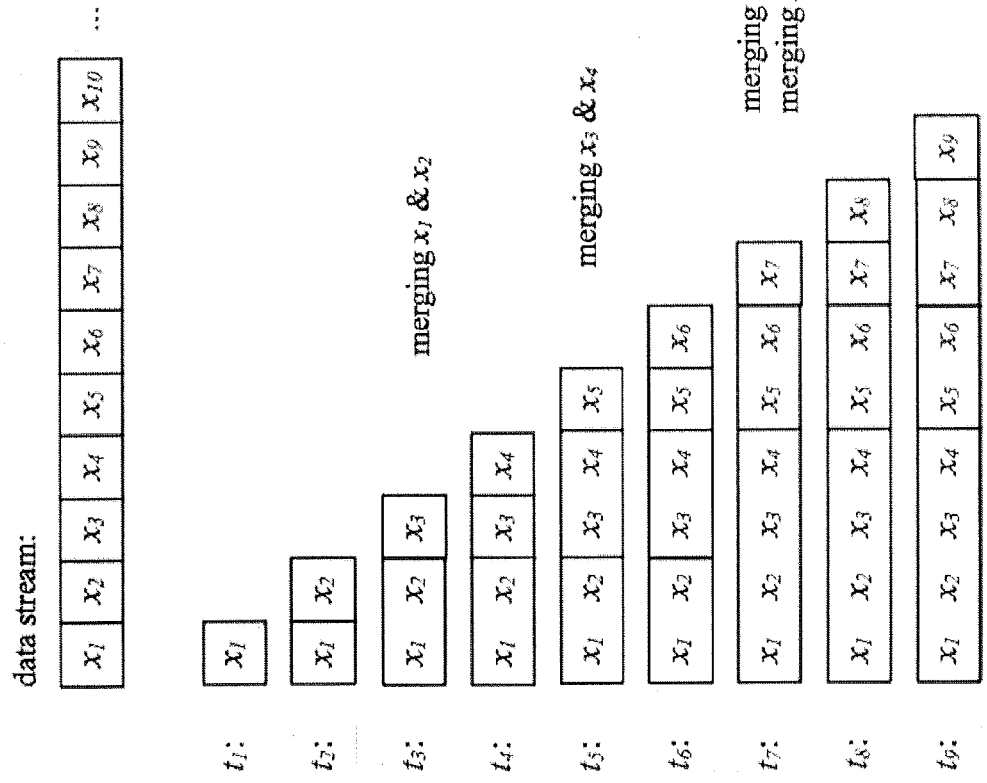
FIG. 8 illustrates a process for storing data values from a data stream in a first bucket of sequence of memory buckets and, when one of the memory buckets becomes full, combining data values from the full memory bucket for storage in a next one of the sequence of memory buckets, in accordance with some embodiments of the present disclosure.

The EH converter 608 receives the properly-ordered measurements from the accumulated buffer 606. The EH converter 608 performs a conversion of measurement into exponential histogram-formatted data values which are ready to be stored in the data storage system 612, such as the Cassandra key-value data store. The exponential histogram-formatted data is referred to herein as "exponential histogram data structure". FIG. 8 depicts this conversion, which is illustrates by a process for storing data values from a data stream in a first bucket of sequence of memory buckets and, when one of the memory buckets becomes full, combining data values from the full memory bucket for storage in a next one of the sequence of memory buckets, in accordance with some embodiments of the present disclosure. The data values in the data streams show the aggregate value of a sequential period, where the index of 1 indicates the oldest data value. This sequential ordering time is preserved. Hence, even if the timestamp is not stored explicitly, the time when the aggregate occurs can still be computed.

In the example of FIG. 8, conversion is performed with the number of repeated bars (k) of 2, which corresponds to the number of data value storage locations within the various illustrative buckets. Each memory bucket contains two bars (data value storage locations) with the same granularity within the same memory bucket. In time t1, the firstly-arrived aggregate data value will be stored in the exponential histogram data structure directly. Similarly, the second aggregate data value is stored directly because the first memory bucket is not full yet. Then, in time t3 as the first memory bucket is full, the last two bars (data value storage locations) in the first memory bucket are merged (combined). The merging (combining) depends on the type of statistics measurement that is maintained. It could be average, sum, and counter, or other mathematic operations are performed on the data values that are combined to generate a combined data value for storage in a next one of the memory buckets in the sequence. It is to be noted that the merging (combining) operation results in one aggregate (combined) data value, instead of keeping the two aggregate data values. Then, in time t4 the aggregate (combined) data value can be stored immediately because the first memory bucket still has one empty space. But, in time t5 the first memory bucket is full; hence the third and the fourth aggregate (combined) data values are merged (combined). It is to be noted that in time t7, two merging operations are performed: the first memory bucket and the second memory bucket because both memory buckets are full (e.g., all data value storage locations of the respective memory buckets are presently used to store data values).

Lastly, the output of the EH converter 608, which is an exponential histogram data structure, is stored persistently in the data storage system 612, such as the Cassandra key-value data store through the vector client 610. How the exponential histogram data structure is managed in the data storage system 612 is elaborated in the following section.

Accordingly, in some embodiments, a method by a database management system can include providing a sequence of memory buckets that each contains a plurality of data value storage locations. For each of the memory buckets, the method responds to the plurality of data value storage locations of one of the memory buckets becoming filled from storage of data values, by generating a combined data value from combination of the data values and storing the combined data value in an unfilled one of the data value storage locations of a next one of the memory buckets in the sequence.

As explained above with regard to FIG. 5, a sequence of data values from a data stream can be stored in sequential ones of the data value storage locations of one of the memory buckets at a beginning of the sequence (e.g., memory bucket (A)).

In a further embodiment, in response to storing the combined data value in the unfilled data value storage location of the next one of the memory buckets in the sequence, the plurality of data value storage locations of the one of the memory buckets that had become filled are reused for storage of more data values therein. Thus, when memory bucket (A) of FIG. 5 becomes full, the data values of memory bucket (A) are combined and stored in a first data storage location of the next memory bucket (B) in the sequence of memory buckets A-F. The data storage locations of memory bucket (A) are then reused for storage of more data values that are incoming from a data stream.

The EV converter 608 can determine an ordering for storage of the sequence of data values from the data stream in the sequential ones of the data value storage locations of the one of the memory buckets at the beginning of the sequence (e.g., memory bucket (A)), based on timestamps associated with each of the sequence of data values from the data stream.

The EH manager 604, the EH converter 608, and/or another component of the system 600 may be configured to regulate how many of the data value storage locations are associated with the one of the memory buckets at the beginning of the sequence based on a rate at which data values from the data stream are received.

The process of responding to the plurality of data value storage locations of one of the memory buckets becoming filled from storage of data values, can include responding to each expiration of a defined time period associated with the one of the memory buckets by generating the combined data value from combination of the data values of one of the memory buckets and storing the combined data value in an unfilled one of the data value storage locations of a next one of the memory buckets in the sequence.

As explained above, at least some of the sequences of memory buckets are managed by a data storage system 612, which may be configured as a key-value data store. When configured as a key-value data store, a one-to-one mapping can be provided between key indexes and at least some of the sequence of memory buckets, and a one-to-one mapping can be provided between value indexes and the data value storage locations within at least some of the sequences of memory buckets. A pair of one of the key indexes and one of the value indexes can thereby be provided to the key-value data store to retrieve a data value stored in one of the data value storage locations of one of the memory buckets.

The key indexes may be generated based on a unique identity of a data stream providing a sequence of data values for storage in the memory buckets. For example, the value indexes can be generated based on time stamps associated with the sequence of data values.

4.3 Using in-Memory (Buffer) Storage

Storing data streams with an exponential histogram introduces a cost to maintain the structure. Therefore, instead of inserting a newly arrived data value into the database, the system needs to perform additional necessary operations to handle the new data value. Hence, this approach will possibly have lower throughput and higher latency. To at least partially recover this loss of throughput, one embodiment of the database management system includes an in-memory storage that uses a buffer memory.

Figure 9:
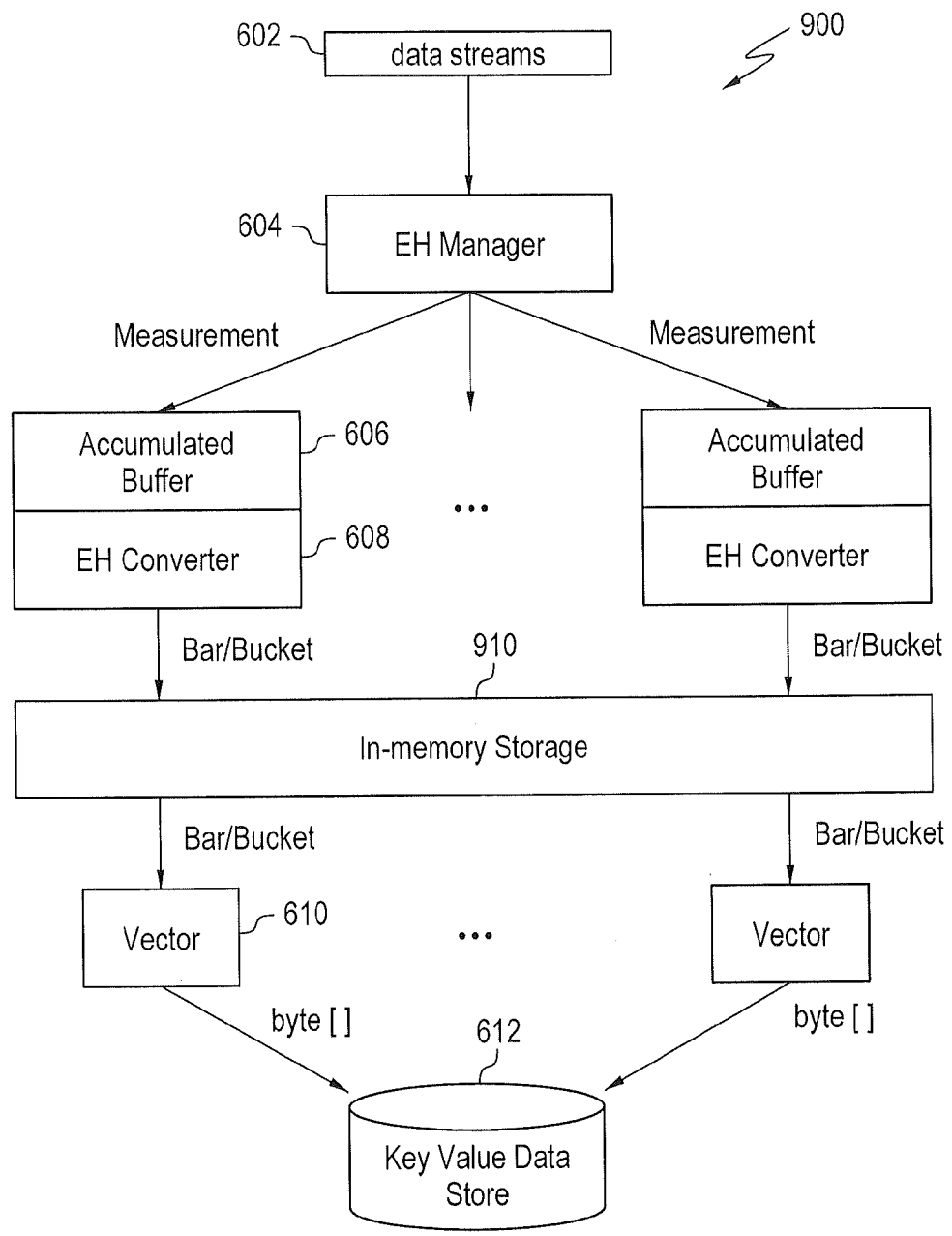
FIG. 9 illustrates the architecture of a database management system with buffer memory storage of one or more of the memory buckets, in accordance with some embodiments of the present disclosure.

FIG. 9 illustrates an architecture of a database management system 900 that includes a buffer memory 910 (in-memory storage) that contains one or more of the memory buckets, in accordance with some embodiments of the present disclosure Understanding the access pattern of buckets in the exponential histogram, the memory buckets of the smaller granularity data values (the most recent buckets) are manipulated more frequently than those of the larger granularity. Thus, the exponential histogram data structure is partitioned by providing some memory buckets for smaller granularities of data values in the buffer memory 910, and the remaining buckets in the data storage system 612 (e.g., Cassandra key-value data store) containing distributed networked storage devices. By providing come of the memory buckets in the buffer memory 910, this approach may significantly reduce the data access load on the data storage system 612. The overall throughput of the database management system 900 may be increased by use of the buffer memory 910.

In one embodiment, the sequence of memory buckets includes a beginning one of the memory buckets in the sequence (e.g., memory bucket (A) of FIG. 5) that stores data values received from outside the database management system. A first group of the memory buckets (e.g., memory buckets (A) and (B)), which includes the beginning one of the memory buckets (memory bucket (A)), resides in the buffer memory 910. A second group of the memory buckets (e.g., memory buckets (C)-(F)), which follows the first group of the memory buckets in the sequence (e.g., memory buckets (A) and (B)), resides in distributed networked storage devices of the data storage system 612.

In a further embodiment, individual ones of the data value storage locations of memory buckets in the buffer memory 910 can be addressed (to access a data value stored therein) using an access request containing a single memory address (e.g., Read Addr.). The data storage system 612 can be a key-value store that distributes the memory buckets across distributed memory storage devices, and in which individual ones of the data value storage locations of memory buckets can be accessed (to retrieve a data value stored therein) using a key-value database request containing a key index and a value index to address one of the data value storage locations of one of the memory buckets.

4.4 Loss of Precision

The exponential histogram operations and methods can function as a form of a gradual approximation of information (e.g., measurements) represented by data values, such as from a data stream, because they gradually compacts the past data values by storing a combination of the past data values (e.g., a summary of the represented information) as an aggregate (combined) data value. Therefore, when there is a need to retrieve an aggregate data value whose time range is less than the lifetime of the bar (memory bucket), the operations and methods provide an approximation (error) in the returned aggregate (combined) data value. This is because the bar (memory bucket) does not have the same precision for satisfying a query compared to if the original data values, which were combined to form the aggregate data value, were used to satisfy the query. For instance, instead of returning data values whose time range is half of the bar (data value stored in one data value storage location of a memory bucket), it can only return a data value whose time range is longer, i.e. the life time of a bar (a data value storage location of the memory bucket). Hence, the loss of precision error depends upon the lifetime of a bar (data value storage locations of a memory bucket). The old bars will return more error than the recent bars.

The loss of precision can be computed as follows. We assumed that the aggregate values are bounded; they have min and max value.

$$\varepsilon \leq \frac{2^B}{\sum_{b=0}^{B-1} k2^b + ((i \bmod k) + 1)2^B} |max - min| \quad (4.1)$$

$$= \frac{2^B}{k(2^B - 1) + ((i \bmod k) + 1)2^B} |max - min| \quad (4.2)$$

$$\leq \frac{2^B}{k(2^B - 1) + 2^B} |max - min| \quad (4.3)$$

$$= \frac{1}{k + 1 - \frac{k}{2^B}} |max - min| \quad (4.4)$$

$$\leq \frac{|max - min|}{k} \quad (4.5)$$

The numerator indicates the weight of the loss of precision error, where B is the identifier of the last bucket where the aggregates occur, while the denominator denotes the total weight. Then, i is the last index of the data item where the aggregates occur; hence, the relation $\beta = \lfloor i/k \rfloor$, where k is the number of repeated bars of the same granularity.

The term on the right is the maximum loss of precision error of applying exponential histogram to the data stream; it is the upper bound of the error. From Equation 4.1 to 4.2, the geometric series formula is applied and further simplified to provide Equation 4.3, because the smallest value for modulo operation is 0. Lastly, by taking the limit of $$\left(1 - \frac{k}{2^B}\right)$$

and B goes to infinity, Equation 4.5 is provided. From here, it can be inferred that the loss of precision error depends on the parameter k.

Chapter 5

5.1 Implementing a Naïve Approach of Storing Data Streams

Figures 10, 11:
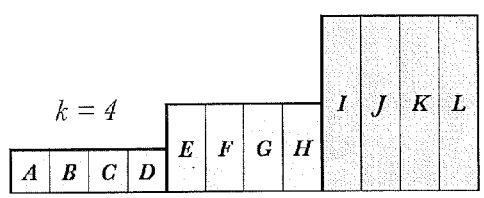
FIG. 10 illustrates the data model for the naïve approach for storing data streams in accordance with some embodiments of the present disclosure.
FIG. 11 illustrates the data model for the bar-wise approach in mapping exponential histogram data structure into the key value data store in accordance with some embodiments of the present disclosure.

Further analysis of embodiments of the database management system is provided using a naïve approach of storing data streams. This is implemented by storing a newly-arrived data item into one Cassandra column. FIG. 10 illustrates the data model for the naïve approach for storing data streams in accordance with some embodiments of the present disclosure. When a data item arrives, the timestamp when the aggregate occurs is used as a column name, while the aggregate value itself is stored in the column value. The row key is the identifier of the data stream. It is optional to partition a data stream into several rows. When the number of columns becomes too large, a new row can be created to store the subsequent data.

With this approach, the complexity of inserting a new data item is O(1). However, it is to be noted that the size of required storage grows linearly.

5.2 Mapping Exponential Histogram Data Structure into Column-Based Key-Value Data Model The key-value data model in Cassandra offers a great flexibility on how to manage the data. The Cassandra user may optimize the data locality by arranging the data items that are likely to access together in physically nearby machines, or even the same machine. Hence, it can alleviate the network traffic due to the routing/coordination messages. It is to be noted that in Cassandra one row consisting of many columns is stored in a single machine.

To design the data model in Cassandra, it should be considered how the data are accessed; what the forecasted pattern of the data manipulation is. In Cassandra, the write throughput is relatively higher than the read throughput, though the read operation is not severely slow. With this, write operation is more preferable than read operation.

A column in Cassandra, which is the smallest storage data entity, is accessed using its row key and the column name. It can be desirable that the row keys are natural keys, rather than surrogate keys. While the basic requirement of key is the ability to uniquely identify a row, surrogate keys have no relation to the actual data in the row. Hence, it suffers an additional overhead to explicitly maintain the relation between the data in the row and its corresponding row key.

There are other Cassandra characteristics which have to be considered in designing the data model. For instance, although the number of columns per row is limited to 2 billion, it can be preferable that a row has a small number of columns. Rows are indexed by their row keys; Columns are sorted by their column name. Another example is that insert operation is treated as upsert. This implies that if the new column does not exist, a new column is created; otherwise, it overwrites the existing column.

By considering the aforementioned analysis as well as the Cassandra behavior as mentioned in Section 3.1.2, two approaches can be implemented for mapping exponential histogram data structure into the Cassandra data model: (1) bar-wise approach, and (2) bucket-wise approach.

5.2.1 Bar-Wise Approach

An exponential histogram data structure has a parameter k that is configurable, depending upon the level of granularity that is required. In the example shown in FIG. 11, the parameter k is equal to 4, which means that each bucket can hold at maximum 4 bars of the same granularity. In this approach, each aggregate value in the exponential histogram data structure is mapped into one Cassandra column. Therefore, a row corresponds to one bucket in the exponential histogram data structure. As the number of columns in a row may vary, a column is only created when it is required.

The row key can be generated as a concatenation between the identifier of exponential histogram and the identifier of bucket. This decision is made in order to prevent from maintaining the list of exponential histogram explicitly. Otherwise, when a ColumnFamily stores only one exponential histogram, there is a need to maintain the list of available ColumnFamilies. The number of exponential histogram is linearly proportional to the number of machines being monitored. Furthermore, creating a new ColumnFamily is more expensive than creating a new row. The row overhead is only 23 bytes, while creating a ColumnFamily incurs an additional overhead of 32 bytes to maintain a new primary key index.

Another advantage of including the bucket id in the row key is that buckets of the same exponential histogram are likely to be nearby, or even in the same machine. To insert a data item in to an exponential histogram data structure with this data model, it is highly likely to access several buckets. For instance, during the merging operation. Hence, this decision would save the network traffic.

Insertion Algorithm

With this Cassandra data model, the conversion from data streams into the exponential histogram structure explained in Section 4.2.2 is implemented as in the pseudocode shown in 1 and 2. It handles the newly-arrived data item by inserting a bar recursively, if necessary.

Algorithm 1 Insertion pseudocode: insert(x)

Require: x is a newly arrived data item
   insert(x, 0)
   time_counter ← time_counter + 1

Algorithm 2 Recursive insertion pseudocode: insert(x, bucketID)

Require: x - the data item, bucketID - the identifier of bucket
   where the data item will be inserted
   if time_counter mod $2^{bucketID}$ = 0 and all buckets whose id < bucketID
   are full then
      lastBar ← read(bucketID.getLastBarID(bucketID)
      secondLastBar ← read(bucketID, getSecondLastBarID(bucketID)
      newBar ← merge(lastBar, secondLastBar)
      insert(newBar, bucketID + 1)
   end if
   bar ← x
   write(bar)

The insertion is implemented in a recursive function. It iterates through the buckets; if the bucket is not full, it ends the iteration. Hence, the complexity of this insertion algorithm is O(log n). In the worst case, it has to iterate all the existing buckets. In the best case, it will only access the first bucket.

The read( ) and write( ) function corresponds to the Cassandra read and write request, respectively. The merging operation consists of two Cassandra column read requests and one write request. This possibly makes the latency of inserting a data item longer. However, it happens only occasionally, when the bucket is full, i.e. the access period of the next bucket.

5.2.2 Bucket-Wise Approach

The second approach that we propose is to store a set of aggregate values in one Cassandra column; see FIG. 12. Hence, instead of storing each bar in one Cassandra column, we store the bars of the same bucket in on Cassandra column. The aggregate values are accumulated in an array of bytes, and it is stored as a column value. Thus, it raises a need to serialize and deserialize the aggregate values. However, with current speed of CPU machine this overhead is negligible.

The motivation to suggest this alternative is that it is likely to access several bars of the same bucket at the same time. For instance, during the merging operation. Hence, with this approach only one column read request is needed. Furthermore, this approach avoids the overhead to create a new column, which is 23 bytes per column inserted.

Insertion Algorithm

The implementation of the insertion algorithm is quite similar to the bar-wise approach; it is done in a recursive way. The pseudocode is shown in both Algorithms 3 and 4, below.

---

Algorithm 3 Insertion pseudocode: insert(x)

---

Require: x is a newly arrived data item
    insert(x, 0)
    time_counter ← time_counter + 1

---

With a similar analysis like in the bar-wise approach, the complexity of this insertion algorithm is O(log n). However, it is important to point out that it requires an additional Cassandra read operation in every iteration. Hence, it is possible that this approach may be slower than the bar-wise approach.

---

Algorithm 4 Recursive insertion pseudocode: insert(x, bucketID)

---

Require: x - the data item, bucketID - the identifier of bucket where
    the data item will be inserted
    bucket ← read(bucketID)
    if time counter mod $2^{bucketID}$ = 0 and all buckets whose id <
    bucketID are full then
        lastBar ← bucket.get(getLastBarID(bucketID))
        secondLastBar ← bucket.get(getSecondLastBarID(bucketID))
        newBar ← merge(lastBar, secondLastBar)
        insert(newBar, bucketID + 1)
    end if
    newBucket ← bucket.add(x)
    write(newBucket)

---

5.3 Utilizing a Singular Array

Implementing an exponential histogram data structure requires shift operations, see FIG. 8. When accommodating a new data item, the existing bars in the bucket have to be shifted towards the inner-side of the data structure. These shift operations represent an aging effect. However, performing a shift in Cassandra would be very costly. It requires reading and writing several Cassandra columns. It is to be noted that changing the column name is not possible in Cassandra. Hence, a singular array is provided to maintain the bars in each bucket (see FIG. 13) in order to avoid performing the shift in Cassandra. A new bar is always appended in one end, instead of being shifted. It is introduced two pointers to remember the oldest bar and the newest bar in the bucket. In the example, the parameter k has a value of 6. The oldest pointer is in the column whose id is 2, while the newest pointer is in 0. The newly arrived data item will be stored in the column whose identifier is 1.

5.4 Producer and Consumer Model for the Stress Test

To observe the performance of the proposed system, a framework is developed that performs a stress test. This framework, which employs the producer and consumer model, can be used to stress a Cassandra cluster itself, the naïve approach storage system, and the proposed system. The producer generates the data streams as much as it can, and then stores them in a synchronized blocking queue. This queue blocks the producer when it is full, thus preventing the Cassandra cluster from collapsing. The data items placed in the buffer are consumed by many consumers. The data items govern the action which will be executed by the consumer. For instance, Cassandra read requests in the case of stress testing the Cassandra read performance, and the insertion of a measurement in the case of stress testing the proposed system.

With this framework, the number of consumers sending the load to the Cassandra cluster can be configured. The buffer in between the producer and the consumers provides an a-synchronization; it decouples between the data streams and the consumers.

Chapter 6
Experiments

6.1 Experimental Setting

All experiments are conducted on a cluster, whose nodes are 1.86 GHz dual-core Intel® Xeon® CPU with 4 GB memory, running on Fedora Core release 6 (Linux 1.2962.fc6). A Cassandra version 1.1.10 was used, which is running on Java HotSpot™ 64-Bit Server VM (20.7-b02) for linux-amd64 JRE (1.6.0_32-b05).

The system utilizes a Cassandra cluster, which consists of 4 nodes. The client process generates the load by sending data streams to the storage system; it runs on one node. A synthetic dataset is used in the experiments. It is generated randomly by following Zipf distribution.

6.2 Benchmarking the Cassandra Performance

To understand the baseline performance of Cassandra, a simple stress test was performed; a hundred threads send 10 million operations (either write or read operations), and then a Cassandra cluster tries to absorb these operations as fast as it can. The throughput and the average operation latency are collected periodically, every 10 seconds.

Figure 14:
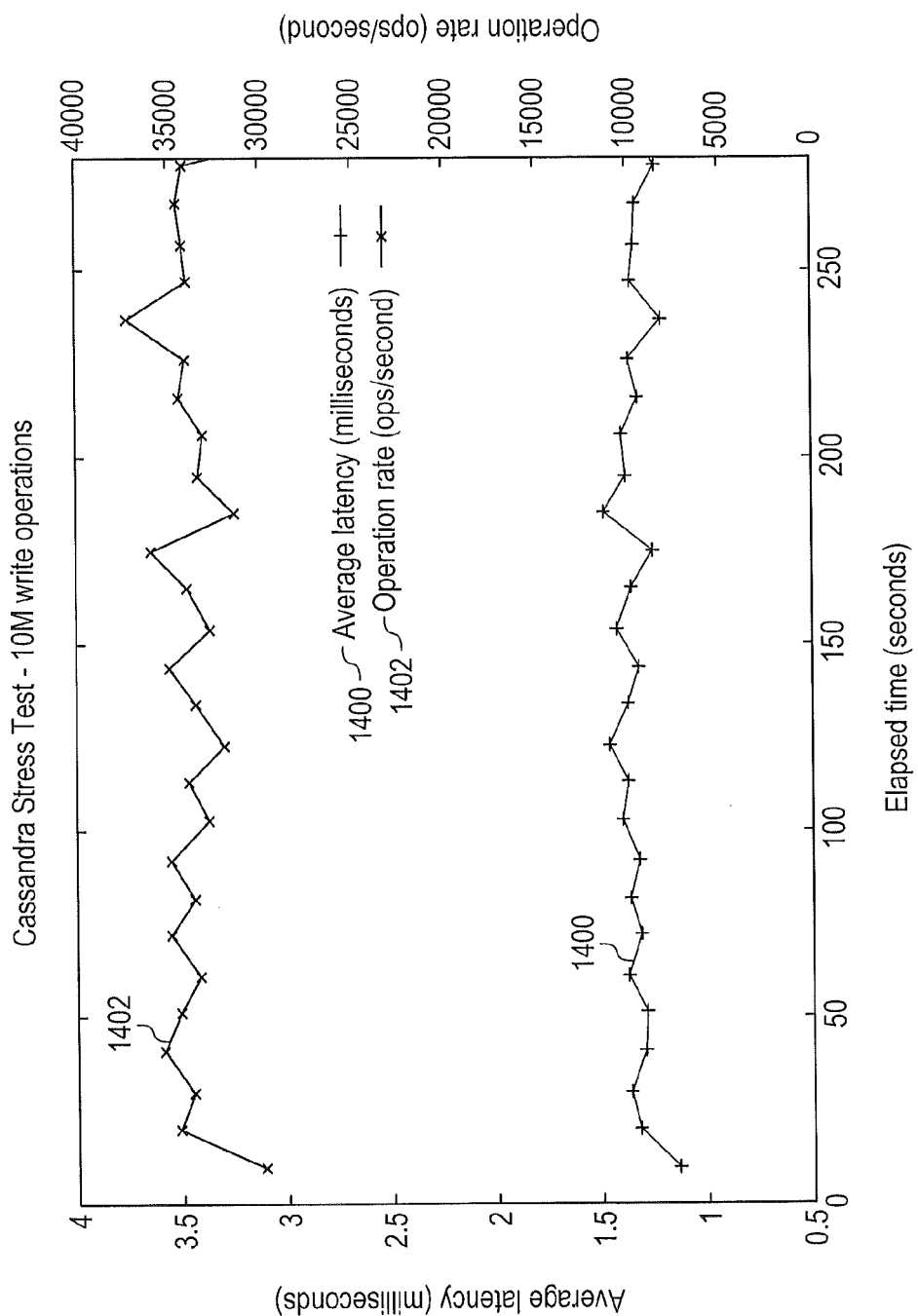
FIG. 14 illustrates a graph of the 4-node Cassandra cluster performance under a write stress test.

FIG. 14 shows that the write throughput for a Cassandra cluster with 4 nodes is roughly 35,000 operations/second, which is relatively high for BigData stores. In the graph, average latency (milliseconds) is shown by line 1400 and an operational rate (operations/second) is shown by line 1402. Moreover, the average operation latency is approximately 1.25 milliseconds. This proves how Cassandra is optimized for high write workload. Cassandra handles a new data insertion by appending a column into SSTable and also the commit log for durability. With this, it can avoid random I/O disks which are usually the bottleneck in the traditional database systems.

Figure 15:
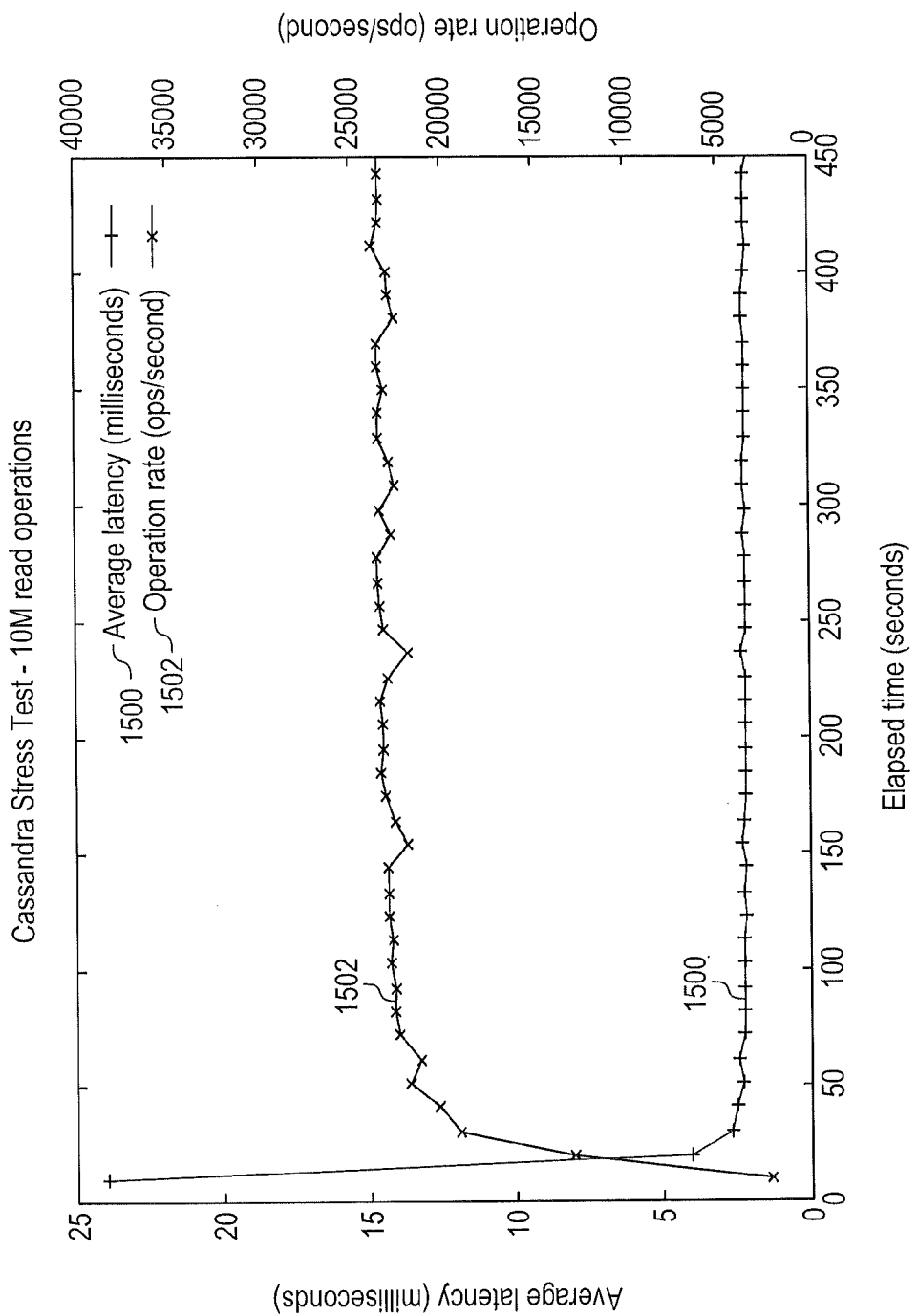
FIG. 15 illustrates a graph of the 4-node Cassandra cluster performance under a read stress test.

FIG. 15 shows the Cassandra performance under the read stress test. In the graph, average latency (milliseconds) is shown by line 1500 and an operational rate (operations/second) is shown by line 1502. The throughput is roughly 24,000 operations/second. Although the read throughput is slightly lower than the write throughput, this number is still relatively high among its kind. In the beginning of read stress test, the latency is significantly long, nearly 25 milliseconds. The reason of this initial poor performance is that in the beginning of test, Cassandra may still keep several versions of the columns in many SSTables which are stored in the disk. Hence, it needs to gather and merge into one SSTable. This action requires many I/O disks. However, it has been optimized by utilizing a bloom filter, and they are sequential I/O disks, instead of random I/O disk. Eventually when many read operations have been performed, it will have less SSTables, thus improving the read latency; only 2 milliseconds in average.

6.3 Naïve Approach in Storing Data Streams

Figure 16:
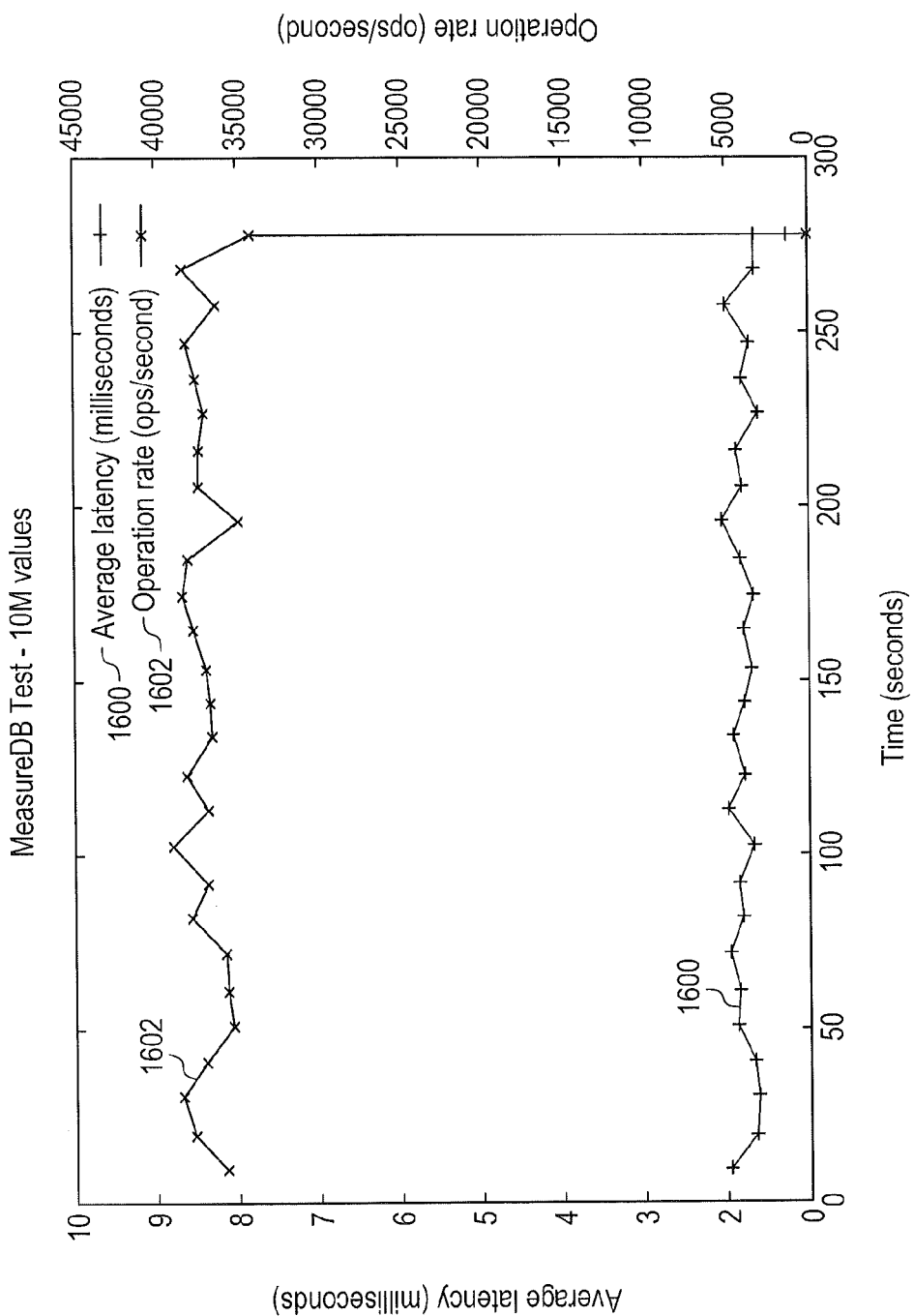
FIG. 16 illustrates a graph of the throughput and average latency of the naïve approach in storing data streams.

The naïve approach in storing data streams is to each value in a Cassandra column. FIG. 16 shows the performance of this approach. In the graph, average latency (milliseconds) is shown by line 1600 and an operational rate (operations/second) is shown by line 1602. As expected, the result is quite similar with the write stress test for Cassandra because this storage system simply inserts the value arrived as a new column. Without adopting an exponential histogram, this naïve approach is able to absorb data streams at rate 35,000 values/second, with an average latency of 1.7 milliseconds. This throughput as a benchmark is sufficient enough to handle data streams. More nodes can be introduced for scalability, thus improving the throughput further.

While the performance of the naïve approach is relatively good, the requirement for the storage space grows linearly, which is undesirable. The data size should not be let unbounded; the limitation of storage space should not be neglected. Furthermore, it may hinder the performance in answering queries. Having abundant data might improve the quality of the query response. However, it will take more time to process and scan the data.

6.4 EHStore without in-Memory Storage

In this experiment, we want to explore the effect of varying the parameter k. We perform a set of experiments by varying the value of parameter k. A hundred threads concurrently send 10 million aggregate values to the proposed system. Then, the proposed system absorbs this data streams, and then processes them accordingly. We measure the latency of each insertion, and then take the average.

6.4.1 Varying k in Bar-Wise Approach

Figure 17:
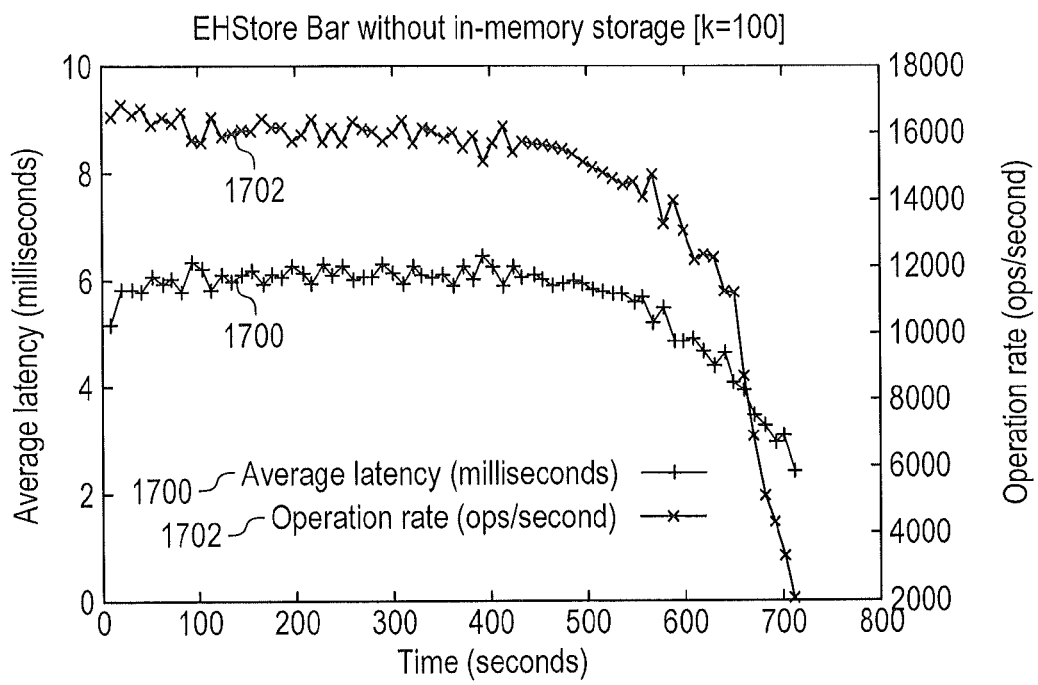
FIG. 17 illustrates graphs of the throughput and average latency of the bar-wise approach with parameter k equal to 100 and 200.
Figure 17:
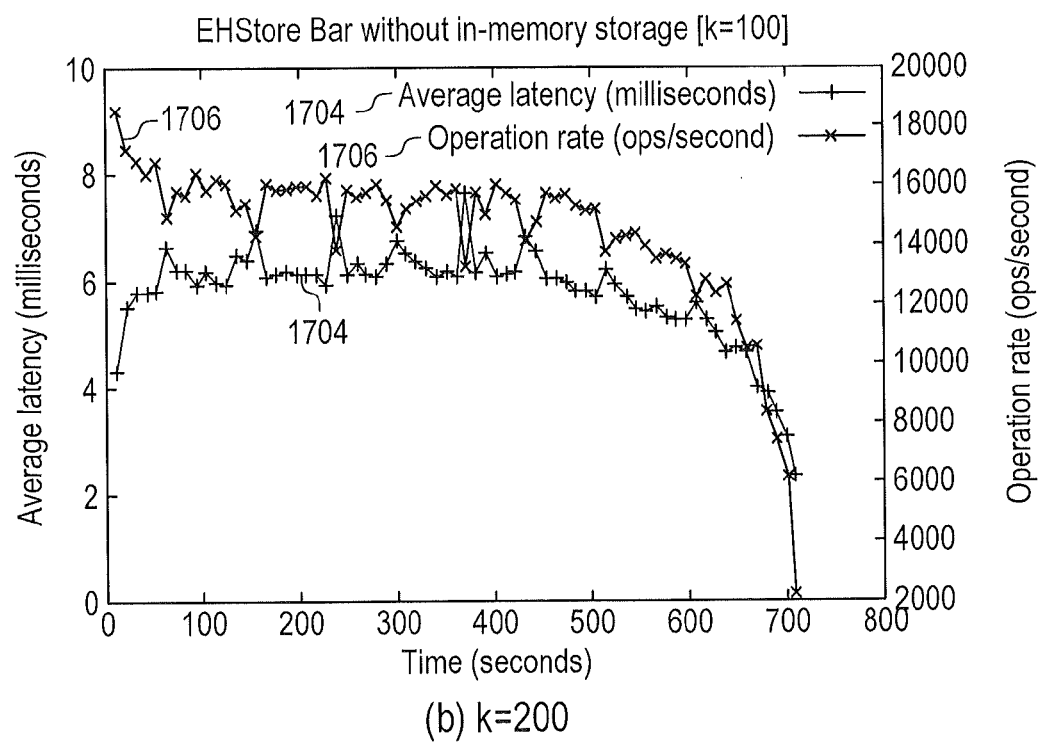

FIG. 17 shows the sample of two experiment results with parameter k equals to 100 and 200. In the graphs, average latency (milliseconds) is shown by lines 1700 and 1704, and operational rate (operations/second) is shown by lines 1702 and 1706.

The throughput and the latency are quite stable, as observed in the plot with k=100. Sometimes, there are noticeable spikes in the throughput as well as the latency. This is mainly due to compaction in Cassandra. Cassandra periodically performs compactions to merge the SSTables, thus slightly affecting the performance of read operations.

The decline observed in the end of plot is merely because some threads have finished sending its iteration. Hence, it reduces the load which arrives in the proposed system.

Figure 18:
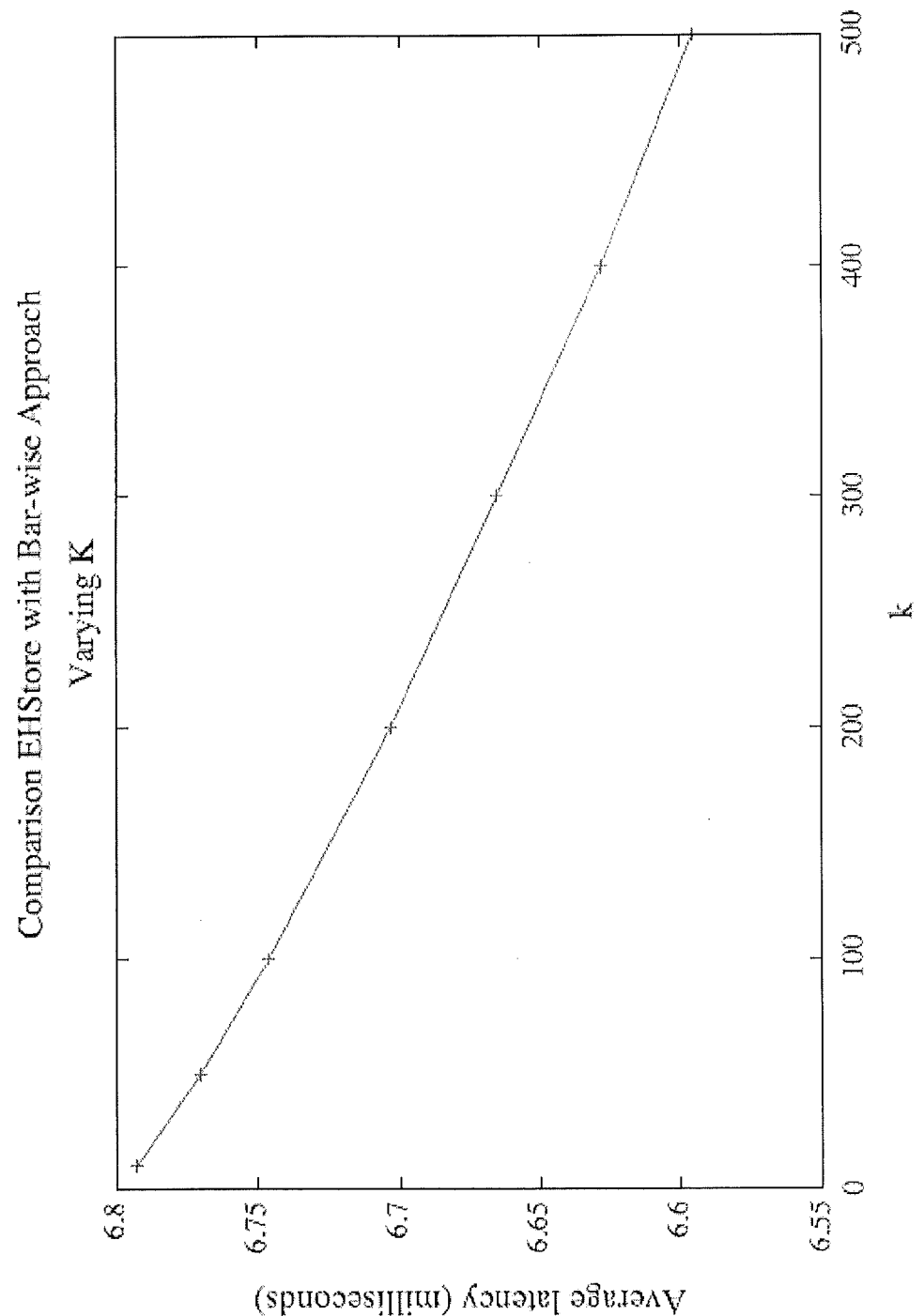
FIG. 18 illustrates a graph showing the affect of the parameter k on the average insertion latency using the bar-wise approach.

FIG. 18 shows how the parameter k affects the average of insertion latency. The larger value of the parameter k will lead to faster latency. This is because the larger k yields less load to the Cassandra cluster due to less frequent updates. It takes more data to fill in the buckets. However, in consequence, larger k requires more storage space. Furthermore, it is important to note that larger k means that the exponential histogram data structure has a better data precision.

6.4.2 Varying k in Bucket-Wise Approach

Figure 19:
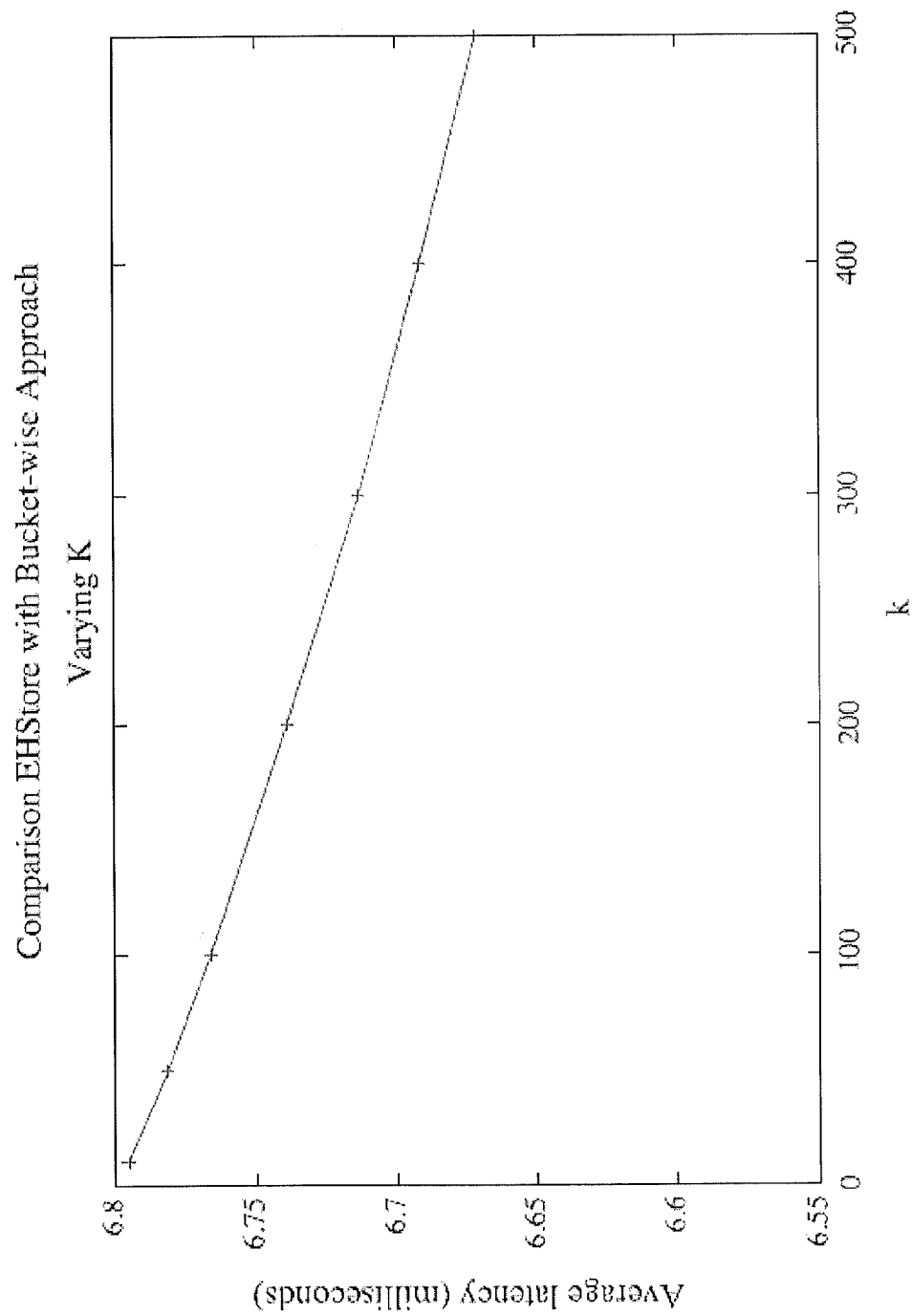
FIG. 19 illustrates a graph showing the affect of the parameter k on the average insertion latency using the bucket-wise approach.

The same set of experiments is executed on the proposed system with bucket-wise approach. FIG. 19 illustrates a similar trend with the one in the bar-wise approach. Larger k leads to faster latency. However, the slope is not as steep as the bar-wise approach. Unlike the bar-wise approach, in the bucket-wise approach inserting a bar into the bucket implies an update to the corresponding Cassandra column storing that particular bucket. Hence, the bucket was always read first to see the value of the existing bars, and then update the bucket to reflect the insertion of new bar.

6.4.3 How the Parameter k Affects the Total Lifetime

The two previous set of experiments show that the larger k will result in the faster latency. However, the larger k implies an increase in the requirement for storage space. Equation 6.1 computes the total lifetime which can be represented by an exponential histogram with k as the number of repeated bars in each bucket, b is the number buckets in an exponential histogram, and X is the time duration of the smallest granularity.

$$\text{Total Lifetime} = \sum_{i=0}^{b-1} 2^i kX = kX(2^b - 1) \qquad (6.1)$$

By using the above formula, we can compute how long the total lifetime an exponential histogram data structure can represent. From this formula, it is observed that the storage space required to store an exponential histogram data structure is O(log n). To have a fair comparison, the storage space is fixed. For instance, 1000 aggregate values. While this number is quite small, it is sufficient to give an overview about the comparison of the total lifetime.

TABLE 6.1

Total lifetime in various k

| k | b | Total Lifetime (seconds) | Equivalent Time |
|---|---|---|---|
| 10 | 100 | 1.3e+31 | 4e+23 years |
| 50 | 20 | 5.2e+07 | 1.7 years |
| 100 | 10 | 1e+05 | 28 hours |
| 200 | 5 | 6.2e+03 | 1.7 hours |
| 300 | 3* | 3.7e+03 | 61 minutes |
| 400 | 2* | 2.8e+03 | 47 minutes |
| 500 | 2 | 1.5e+03 | 25 minutes |

An exponential histogram data structure requires bk bars, where each bar stores an aggregate value. The fixed storage space of 1000 aggregate values can be used to store an exponential histogram with many combinations for the parameter b and k. Table 6.1 represents some of the possible combinations. The asterisk symbol in the column b indicates that the last bucket only consists of the leftover bars, instead of k bars. From the table, it is observed that decreasing the value of k will increase the total lifetime that the exponential histogram data structure can represent exponentially. As comparison, with k=500 and k=50 an exponential histogram data structure with 1000 aggregate values can represent 25 minutes and 1.7 years, respectively.

6.5 EHStore with in-Memory Storage

In this experiment, we evaluate the performance of the proposed system with in-memory storage in term of the throughput and the average insertion latency. For each experiment, the proposed system is tested to absorb 10 million aggregate values which are generated by a hundred threads.

6.5.1 Bar-Wise Approach

Figure 20:
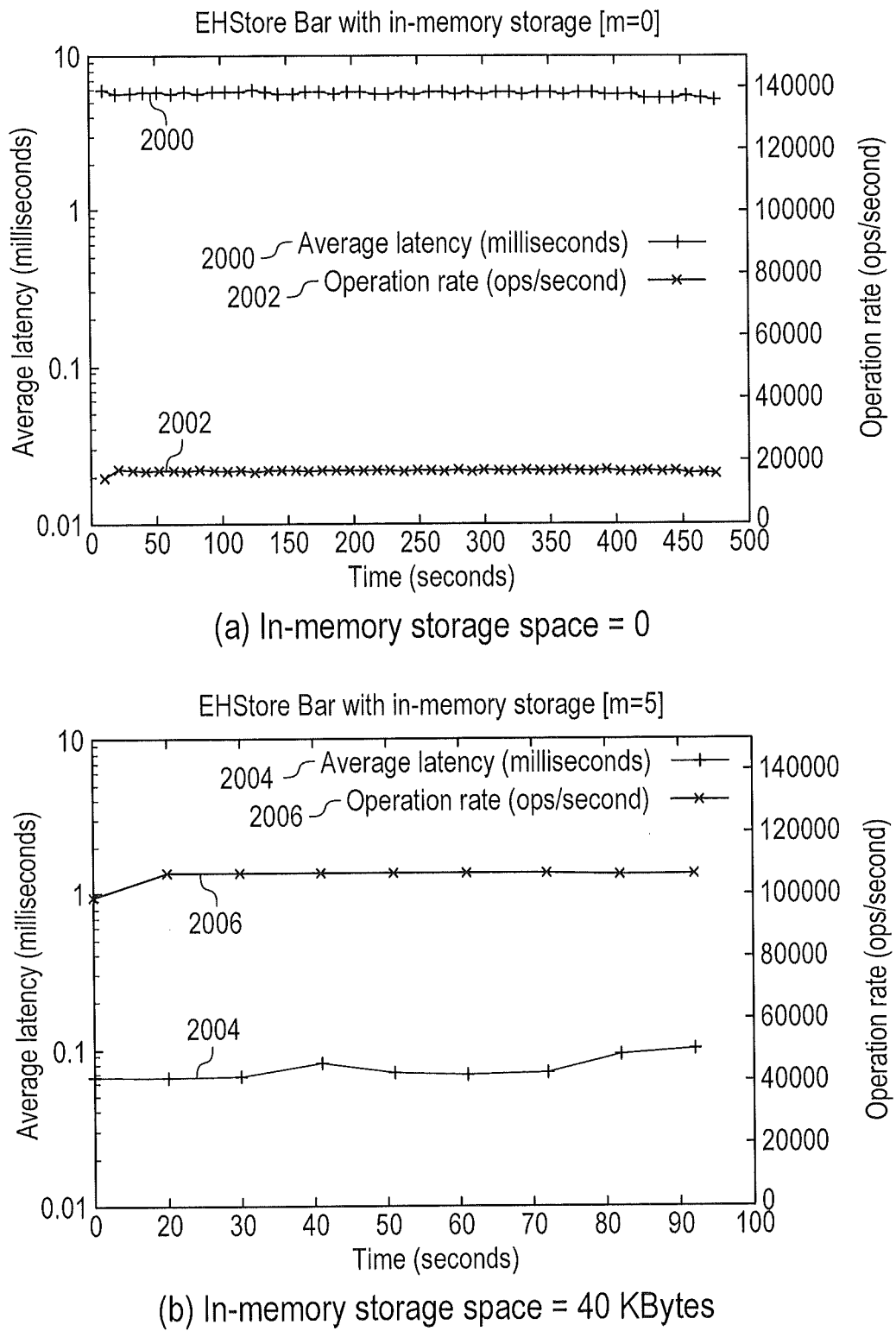
FIG. 20 illustrates graphs of the throughput and average latency of the bar-wise approach without and with 20 KBytes of in-memory storage.

FIG. 20 shows the experiment results without and with 20 KBytes in-memory storage. In the graphs, average latency (milliseconds) is shown by lines 2000 and 2004, and operational rate (operations/second) is shown by lines 2002 and 2006. By introducing only 1% of the memory spaces, the performance can be improved significantly. The average insertion latency drops, becomes 0.1 milliseconds from initially 5 milliseconds. Hence, this results in a notable increase in the total throughput. Having 20 KBytes in-memory storage in this experiment implies that the first 5 buckets are managed in the memory. The load for these 5 buckets which are initially for the Cassandra cluster are now shifted to the memory. Hence, this reduces the load for the Cassandra cluster. In turn, it enhances the total performance of the proposed system.

Figure 21:
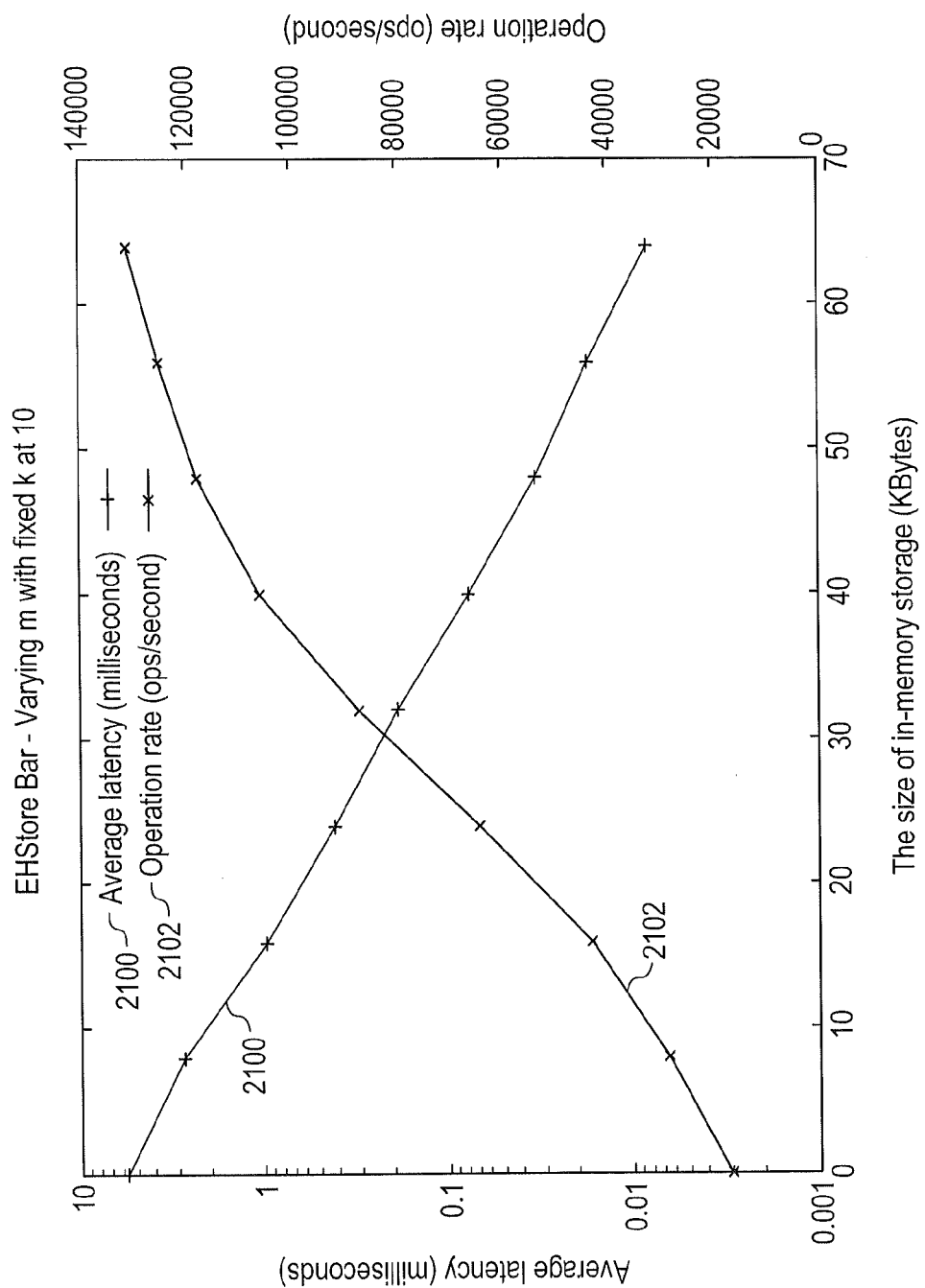
FIG. 21 illustrates a graph showing the affect of the in-memory storage size on the throughput and average latency using the bar-wise approach.

By adjusting the size of in-memory storage to be used in the storage system, the desired throughput and the average insertion latency can be controlled. FIG. 21 shows how an increase in the size of in-memory storage can gradually improve the performance of the proposed system. In the graph, average latency (milliseconds) is shown by line 2100 and operational rate (operations/second) is shown by line 2102. The average insertion latency drops exponentially, while the throughput increases linearly. It is important to note that by introducing in-memory storage, the proposed system can have a better performance than the baseline storage system (the naïve approach).

6.5.2 Bucket-Wise Approach

Figure 22:
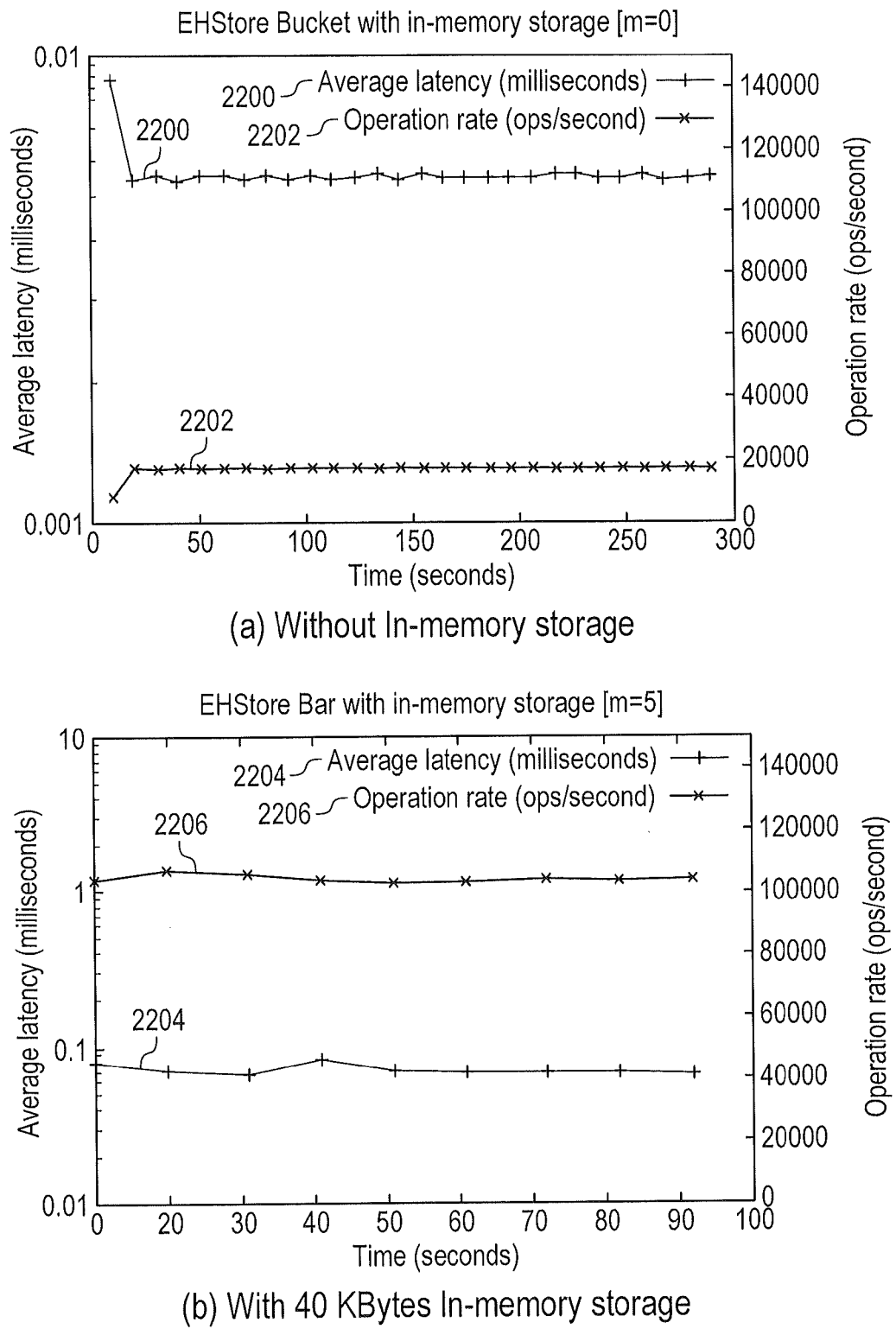
FIG. 22 illustrates graphs of the throughput and average latency of the bucket-wise approach without and with 20 KBytes of in-memory storage.

The same set of experiments is also executed on the proposed system with bucket-wise approach. FIG. 22 shows a comparison between the proposed system without in-memory storage and with in-memory storage. In the graphs, average latency (milliseconds) is shown by lines 2200 and 2204, and operational rate (operations/second) is shown by lines 2202 and 2206. The similar findings are also found this experiment. By only introducing 40 KBytes in-memory storage into the proposed system, it can significantly enhance the performance of the proposed system in term of throughout and the average insertion latency.

Figure 23:
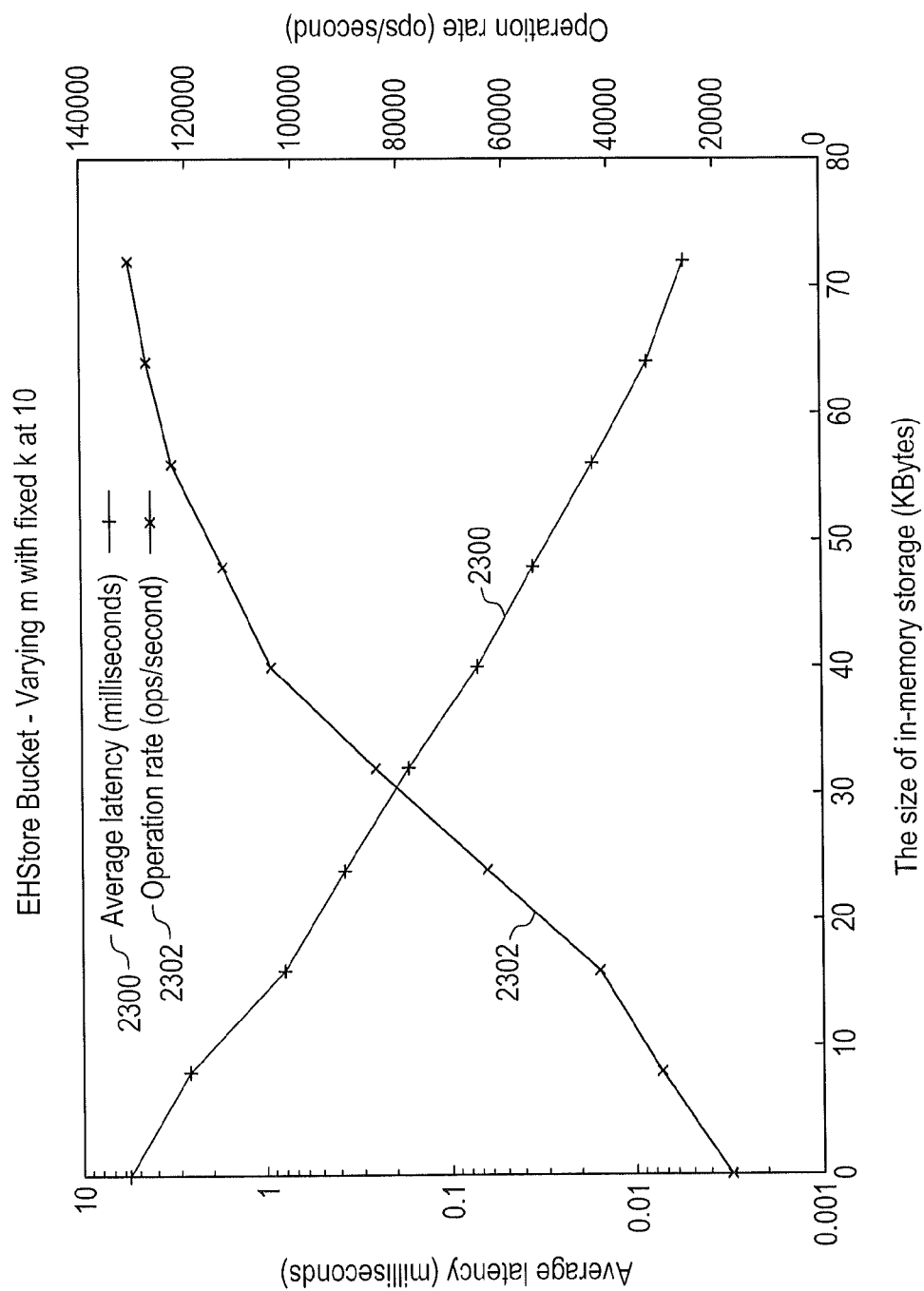
FIG. 23 illustrates a graph showing the affect of the in-memory storage size on the throughput and average latency using the bucket-wise approach.

FIG. 23 shows the effect of varying the size of in-memory storage. In the graph, average latency (milliseconds) is shown by line 2300 and operational rate (operations/second) is shown by line 2302. Similar trends with those in the bar-wise approach are also observed in this approach. The average insertion latency drops exponentially, while the throughput increases linearly.

6.5.3 Example Processing Node

Figure 24:
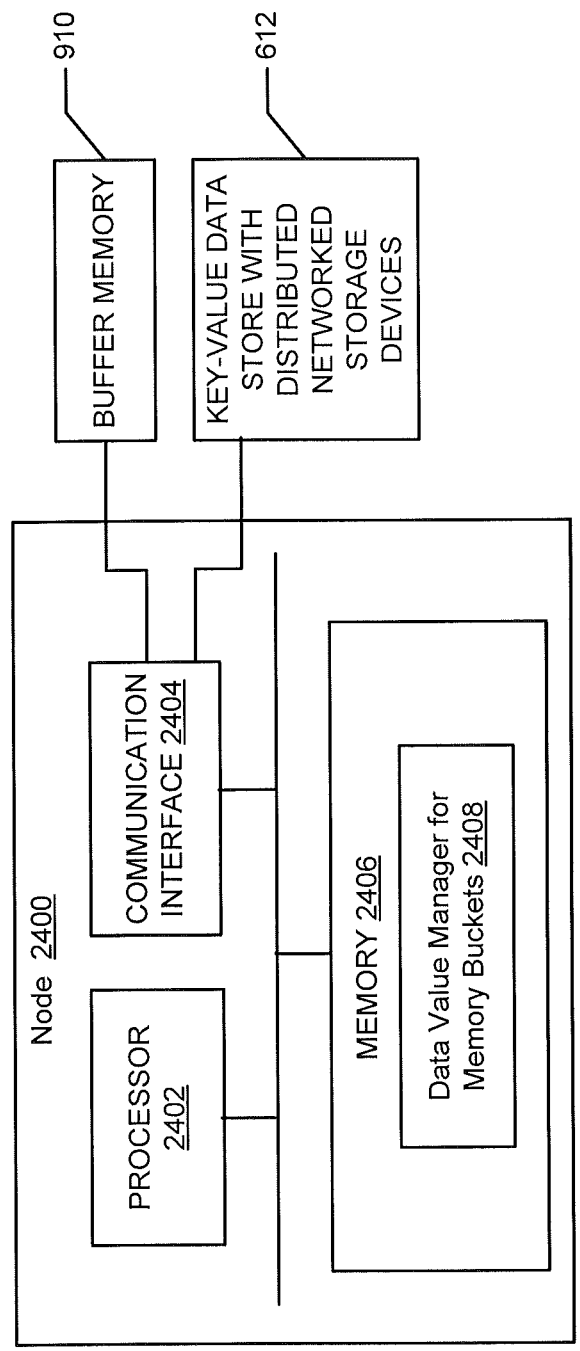
FIG. 24 is a block diagram of processing node that may be incorporated into one or more components of the database management system of FIGS. 1-23.

FIG. 24 is a block diagram of node 2400 that may be incorporated into one or more components of a database management system of FIGS. 1-23 to provide the functionality described herein according to some embodiments of the present disclosure. The node 2400 includes a processor 2402, a communication interface 2404, and a memory 2406. The communication interface 2404 can be configured to communicate over one or more wired/wireless data networks with other components of a database management system, such as the buffer memory 910 and a key-value data store with distributed networked storage devices (e.g., data storage system) 612. The processor 2402 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc) or distributed across one or more data networks. The processor 2402 is configured to execute computer readable program code of functional applications residing in the memory 2406, described below as a computer readable storage medium, to perform at least some of the operations and methods described herein as being performed by a database management system in accordance with one or more embodiments disclosed herein. The functional applications may include a data value manager for memory buckets 2408, which functions as described above for managing storage and combining of data values in data value storage locations of memory buckets in the buffer memory 910 and/or the key-value data store with distributed networked storage devices (e.g., data storage system) 612.

6.6 Summary

A set of extensive experiments has been performed to evaluate the proposed system. A simply storage system which employs a naïve approach in storing the aggregate values is developed; this is used as the baseline comparison of some embodiments of the system. Some embodiments, which also use Cassandra in the back-end, offer an acceptable performance. However, the size of storage system grows linearly. Some embodiments were discussed that use an exponential histogram to limit the growth of data size to O(log n). The experiments show that there is a cost in maintaining the exponential histogram data structure. Inserting an aggregate value costs O(log n), instead of O(1). When the in-memory storage has been introduced, the experiments show that the throughput increases, and the average insertion latency decreases. Even with a small size of in-memory size, the performance significantly improves.

Chapter 7

CONCLUSIONS

7.1 Conclusions

Many of today's applications generate data streams, instead of a persistent data set. This raises a need to specifically design storage system that are suitable with the nature of data streams. The present disclosure has explained these characteristics of data streams as well as how they affect the requirements for managing the data streams. Considering these restrictions, various storage systems have been disclosed that are configured to receive and store data values from data streams. Various embodiments use an exponential histogram data structure which compacts past information represented by data values by taking its summary (or other mathematic combination) over time. This process is performed while inserting a newly arrived data. Hence, this overhead may slow down the performance of the proposed system in terms of throughput and average insertion latency. To alleviate this, an in-memory storage can be proved that is responsible for handling a defined set of more recent data value memory buckets. Experiments show that this in-memory storage can enhance the performance of at least some embodiments of the system.

The experiments also demonstrate how the parameter k affects the absorption of the proposed system; larger k increases the absorption because it requires less updates. However, it is noted that the larger k can increase the required size of storage linearly. Depending upon the trade-off between the desirable precision and the size of the storage system, this parameter k can be adjusted.

The exponential histogram can provide the ability to compact the aggregates, thus limiting the size of a storage system that is needed to support a defined set of data streams. The in-memory storage can help the proposed system to increase the absorption level.

7.2 Further Embodiments and Definitions

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a buffered repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by a database management system, comprising:
   providing a sequence of memory buckets that each contain a plurality of data value storage locations;
   for each of the memory buckets, responding to the plurality of data value storage locations of one of the memory buckets becoming filled from storage of data values, by generating a combined data value from combination of the data values and storing the combined data value in an unfilled one of the data value storage locations of a next one of the memory buckets in the sequence; and
   in response to storing the combined data value in the unfilled data value storage location of the next one of the memory buckets in the sequence, reusing the plurality of data value storage locations of the one of the memory buckets that had become filled for storage of more data values therein.

2. A method by a database management system, comprising:
   providing a sequence of memory buckets that each contain a plurality of data value storage locations;
   for each of the memory buckets, responding to the plurality of data value storage locations of one of the memory buckets becoming filled from storage of data values, by generating a combined data value from combination of the data values and storing the combined data value in an unfilled one of the data value storage locations of a next one of the memory buckets in the sequence;
   storing a sequence of data values, from a data stream, in sequential ones of the data value storage locations of one of the memory buckets at a beginning of the sequence; and
   determining an ordering for storage of the sequence of data values from the data stream in the sequential ones of the data value storage locations of the one of the memory buckets at the beginning of the sequence, based on timestamps associated with each of the sequence of data values from the data stream.

3. A method by a database management system, comprising:
   providing a sequence of memory buckets that each contain a plurality of data value storage locations;
   for each of the memory buckets, responding to the plurality of data value storage locations of one of the memory buckets becoming filled from storage of data values, by generating a combined data value from combination of the data values and storing the combined data value in an unfilled one of the data value storage locations of a next one of the memory buckets in the sequence;
   storing a sequence of data values, from a data stream, in sequential ones of the data value storage locations of one of the memory buckets at a beginning of the sequence; and
   regulating how many of the data value storage locations are associated with the one of the memory buckets at the beginning of the sequence based on a rate at which data values from the data stream are received.

4. A method by a database management system, comprising:
   providing a sequence of memory buckets that each contain a plurality of data value storage locations;
   for each of the memory buckets, responding to the plurality of data value storage locations of one of the memory buckets becoming filled from storage of data values, by generating a combined data value from combination of the data values and storing the combined data value in an unfilled one of the data value storage locations of a next one of the memory buckets in the sequence;
   storing a sequence of data values, from a data stream, in sequential ones of the data value storage locations of one of the memory buckets at a beginning of the sequence; and
   wherein responding to the plurality of data value storage locations of one of the memory buckets becoming filled from storage of data values, comprises:
      responding to each expiration of a defined time period associated with the one of the memory buckets by generating the combined data value from combination of the data values of the one of the memory buckets and storing the combined data value in an unfilled one of the data value storage locations of a next one of the memory buckets in the sequence.

5. A method by a database management system, comprising:
   providing a sequence of memory buckets that each contain a plurality of data value storage locations;
   for each of the memory buckets, responding to the plurality of data value storage locations of one of the memory buckets becoming filled from storage of data values, by generating a combined data value from combination of the data values and storing the combined data value in an unfilled one of the data value storage locations of a next one of the memory buckets in the sequence;
   storing a sequence of data values, from a data stream, in sequential ones of the data value storage locations of one of the memory buckets at a beginning of the sequence; and
   each of the memory buckets in the sequence contain a same number of data value storage locations.

6. The method of claim 1, wherein the combined data value is generated by a mathematic operation performed on the data values stored in the plurality of data value storage locations of the one of the memory buckets that has become filled.

7. A method by a database management system, comprising:
   providing a sequence of memory buckets that each contain a plurality of data value storage locations;
   for each of the memory buckets, responding to the plurality of data value storage locations of one of the memory buckets becoming filled from storage of data values, by generating a combined data value from combination of the data values and storing the combined data value in an unfilled one of the data value storage locations of a next one of the memory buckets in the sequence;
   wherein at least some of the sequence of memory buckets are managed by a key-value data store;

providing a one-to-one mapping between key indexes and the at least some of the sequence of memory buckets;

providing a one-to-one mapping between value indexes and the data value storage locations within the at least some of the sequence of memory buckets;

providing a pair of one of the key indexes and one of the value indexes to the key-value data store to retrieve a data value stored in one of the data value storage locations of one of the memory buckets; and generating the key indexes based on a unique identity of a data stream providing a sequence of data values for storage in the memory buckets.

8. The method of claim 7, further comprising:

generating the value indexes based on time stamps associated with the sequence of data values.

9. A method by a database management system, comprising:

providing a sequence of memory buckets that each contain a plurality of data value storage locations; and for each of the memory buckets, responding to the plurality of data value storage locations of one of the memory buckets becoming filled from storage of data values, by generating a combined data value from combination of the data values and storing the combined data value in an unfilled one of the data value storage locations of a next one of the memory buckets in the sequence, wherein:

the sequence of memory buckets includes a beginning one of the memory buckets in the sequence that stores data values received from outside the database management system;

a first group of the memory buckets, which includes the beginning one of the memory buckets, resides in a buffer memory; and a second group of the memory buckets, which follows the first group of the memory buckets in the sequence, resides in distributed networked storage devices.

10. The method of claim 9, further comprising:

addressing an individual one of the data value storage locations of one of the memory buckets in the buffer memory using a single memory address; and providing a key-value database request containing a key index and a value index to address one of the data value storage locations of one of the memory buckets in the distributed memory storage devices.

11. A computer system comprising:

a processor; and a memory coupled to the processor and comprising computer readable program code that when executed by the processor causes the processor to perform operations to:

provide a sequence of memory buckets that each contain a plurality of data value storage locations;

for each of the memory buckets, respond to the plurality of data value storage locations of one of the memory buckets becoming filled from storage of data values, by generating a combined data value from combination of the data values and storing the combined data value in an unfilled one of the data value storage locations of a next one of the memory buckets in the sequence;

store a sequence of data values, from a data stream, in sequential ones of the data value storage locations of one of the memory buckets at a beginning of the sequence; and determine an ordering for storage of the sequence of data values from the data stream in the sequential ones of the data value storage locations of the one of the memory buckets at the beginning of the sequence, based on timestamps associated with each of the sequence of data values from the data stream.

12. The computer system of claim 11, wherein the memory further comprises computer readable program code that when executed by the processor causes the processor to perform operations to:

respond to storing the combined data value in the unfilled data value storage location of the next one of the memory buckets in the sequence, by reusing the plurality of data value storage locations of the one of the memory buckets that had become filled for storage of more data values therein.

13. A computer system comprising:

a processor; and a memory coupled to the processor and comprising computer readable program code that when executed by the processor causes the processor to perform operations to:

provide a sequence of memory buckets that each contain a plurality of data value storage locations;

for each of the memory buckets, respond to the plurality of data value storage locations of one of the memory buckets becoming filled from storage of data values, by generating a combined data value from combination of the data values and storing the combined data value in an unfilled one of the data value storage locations of a next one of the memory buckets in the sequence;

store a sequence of data values, from a data stream, in sequential ones of the data value storage locations of one of the memory buckets at a beginning of the sequence; and regulate how many of the data value storage locations are associated with the one of the memory buckets at the beginning of the sequence based a rate at which data values from the data stream are received.

14. A computer system comprising:

a processor; and a memory coupled to the processor and comprising computer readable program code that when executed by the processor causes the processor to perform operations to:

provide a sequence of memory buckets that each contain a plurality of data value storage locations;

for each of the memory buckets, respond to the plurality of data value storage locations of one of the memory buckets becoming filled from storage of data values, by generating a combined data value from combination of the data values and storing the combined data value in an unfilled one of the data value storage locations of a next one of the memory buckets in the sequence;

store a sequence of data values, from a data stream, in sequential ones of the data value storage locations of one of the memory buckets at a beginning of the sequence; and respond to each expiration of a defined time period associated with the one of the memory buckets by generating the combined data value from combination of the data values of the one of the memory buckets and storing the combined data value in an unfilled one of the data value storage locations of a next one of the memory buckets in the sequence.

15. A computer system comprising:

a processor; and a memory coupled to the processor and comprising computer readable program code that when executed by the processor causes the processor to perform operations to:

provide a sequence of memory buckets that each contain a plurality of data value storage locations;

for each of the memory buckets, respond to the plurality of data value storage locations of one of the memory buckets becoming filled from storage of data values, by generating a combined data value from combination of the data values and storing the combined data value in an unfilled one of the data value storage locations of a next one of the memory buckets in the sequence, wherein at least some of the sequence of memory buckets are managed by a key-value data store;

provide a one-to-one mapping between key indexes and the at least some of the sequence of memory buckets;

provide a one-to-one mapping between value indexes and the data value storage locations within the at least some of the sequence of memory buckets; and provide a pair of one of the key indexes and one of the value indexes to the key-value data store to retrieve a data value stored in one of the data value storage locations of one of the memory buckets.

16. The computer system of claim 15, wherein the memory further comprises computer readable program code that when executed by the processor causes the processor to perform operations to:

generate the key indexes based on a unique identity of a data stream providing a sequence of data values for storage in the memory buckets; and generate the value indexes based on time stamps associated with the sequence of data values.

17. A computer system comprising:

a processor; and a memory coupled to the processor and comprising computer readable program code that when executed by the processor causes the processor to perform operations to:

provide a sequence of memory buckets that each contain a plurality of data value storage locations; and for each of the memory buckets, respond to the plurality of data value storage locations of one of the memory buckets becoming filled from storage of data values, by generating a combined data value from combination of the data values and storing the combined data value in an unfilled one of the data value storage locations of a next one of the memory buckets in the sequence, wherein:

the sequence of memory buckets includes a beginning one of the memory buckets in the sequence that stores data values received from outside the database management system;

a first group of the memory buckets, which includes the beginning one of the memory buckets, resides in a buffer memory; and a second group of the memory buckets, which follows the first group of the memory buckets in the sequence, resides in distributed networked storage devices.

18. A computer system comprising:

a processor; and a memory coupled to the processor and comprising computer readable program code that when executed by the processor causes the processor to perform operations to:

provide a sequence of memory buckets that each contain a plurality of data value storage locations;

for each of the memory buckets, respond to the plurality of data value storage locations of one of the memory buckets becoming filled from storage of data values, by generating a combined data value from combination of the data values and storing the combined data value in an unfilled one of the data value storage locations of a next one of the memory buckets in the sequence;

address an individual one of the data value storage locations of one of the memory buckets in the buffer memory using a single memory address; and provide a key-value database request containing a key index and a value index to address one of the data value storage locations of one of the memory buckets in the distributed memory storage devices.

\* \* \* \* \*